US011232408B2

(12) United States Patent
Taylor et al.

(10) Patent No.: US 11,232,408 B2
(45) Date of Patent: *Jan. 25, 2022

(54) MODEL-ASSISTED EVALUATION AND INTELLIGENT INTERVIEW FEEDBACK

(71) Applicant: HireVue, Inc., South Jordan, UT (US)

(72) Inventors: Benjamin Taylor, Lehi, UT (US); Loren Larsen, Lindon, UT (US)

(73) Assignee: HireVue, Inc., South Jordan, UT (US)

( * ) Notice: Subject to any disclaimer, the term of this patent is extended or adjusted under 35 U.S.C. 154(b) by 217 days.

This patent is subject to a terminal disclaimer.

(21) Appl. No.: 16/459,973

(22) Filed: Jul. 2, 2019

(65) Prior Publication Data

US 2019/0392397 A1 Dec. 26, 2019

Related U.S. Application Data

(63) Continuation of application No. 15/613,901, filed on Jun. 5, 2017, now Pat. No. 10,346,805, which is a continuation of application No. 14/543,736, filed on Nov. 17, 2014, now Pat. No. 9,710,790.

(60) Provisional application No. 61/928,308, filed on Jan. 16, 2014.

(51) Int. Cl.
*G06Q 10/10* (2012.01)

(52) U.S. Cl.
CPC .................. *G06Q 10/1053* (2013.01)

(58) Field of Classification Search
None
See application file for complete search history.

(56) References Cited

U.S. PATENT DOCUMENTS

| 6,618,734 | B1* | 9/2003 | Williams ............... G06Q 10/06 |
| 7,457,764 | B1 | 11/2008 | Bullock et al. |
| 8,060,390 | B1 | 11/2011 | Overstreet |
| 8,200,584 | B2 | 6/2012 | Brickman, Jr. |
| 8,353,750 | B2 | 1/2013 | Patchen |
| 9,197,849 | B2* | 11/2015 | Bolton ............... G06Q 10/105 |

(Continued)

OTHER PUBLICATIONS

Breiman, Leo, "Random Forests", Machine Learning 45.1, (2001):5-32.

(Continued)

*Primary Examiner* — Andrew B Whitaker
(74) *Attorney, Agent, or Firm* — Lowenstein Sandler LLP

(57) ABSTRACT

A computing system includes a processing device to execute instructions to: store a trained modeling function that embodies a correlation between historical ratings and historical evaluation results of recorded responses that were responsive to prompts presented to a set of persons; receive a request to initiate a digital evaluation process for a second person; receive recorded responses of the second person that are responsive to the prompts; generate, by applying the trained modeling function to the recorded responses of the second person, a reviewing sequence by which to view the recorded responses of the second person. The reviewing sequence orders the recorded responses from a most predictive prompt to a least predictive prompt to reduce a time required to efficiently determine an evaluation result. The system further transmits data that causes display of a list of the recorded responses of the second person in the reviewing sequence.

20 Claims, 14 Drawing Sheets

(56) References Cited

U.S. PATENT DOCUMENTS

| | | | |
|---|---|---|---|
| 2006/0036647 | A1 | 2/2006 | Fichtner et al. |
| 2006/0082068 | A1 | 4/2006 | Patchen |
| 2006/0229896 | A1 | 10/2006 | Rosen et al. |
| 2006/0277056 | A1* | 12/2006 | Broberg ............... G06Q 10/10 705/321 |
| 2007/0088601 | A1 | 4/2007 | Money et al. |
| 2009/0228323 | A1 | 9/2009 | Ebrahimian |
| 2010/0153520 | A1 | 6/2010 | Daun et al. |
| 2010/0161503 | A1 | 6/2010 | Foster |
| 2010/0322589 | A1* | 12/2010 | Henderson ........... H04N 5/2222 386/224 |
| 2011/0119212 | A1 | 5/2011 | De Bruin et al. |
| 2011/0300916 | A1 | 12/2011 | Patchen |
| 2012/0144424 | A1 | 6/2012 | Ganesan et al. |
| 2012/0265770 | A1* | 10/2012 | Desjardins ............ G06Q 30/02 707/748 |
| 2013/0184082 | A1 | 7/2013 | Patchen |
| 2013/0226578 | A1 | 8/2013 | Bolton et al. |
| 2013/0260357 | A1* | 10/2013 | Reinerman-Jones ................. G06Q 10/1053 434/362 |
| 2014/0156356 | A1* | 6/2014 | Olivier ............ G06Q 10/06398 705/7.36 |
| 2014/0236852 | A1 | 8/2014 | Emmerton |

OTHER PUBLICATIONS

Adam Bryant, "Ongpas and Brainteasers: New insights from Google on Recruiting and Hiring," http://www.linkedin.com/today/post/article/20130620142512-35894743-on-gpas-and-brain-teasers-new-insights-from-google-on-recruiting-and-hiring, 8 pages, Jun. 2013.

Conway et al., "Comparing Structured Interview Questions Types: Construct Validity and Applicant Reactions," Journal of Business and Psychology, 13(4):485-506, Dec. 1999.

Hagan, et al., "Neural Network Design," 2nd Edition, Pws Pub. Boston, 1012 pages, 1996.

Hamdani et al., "The Relentless Pursuit of Construct Validity in the Design of Employment Interviews," Human Resource Management Review, pp. 160-176, 2014.

Haulphenne et al., "On the Link Between Markovian Trees and Tree-Structured Markov Chains," European Journal of Operational Research, 201(3):791-798, 2010.

Hearst et al., "Support Vector Machines," Intelligent Systems, IEEE, 13(4):18-28, 1998.

Spade et al., "A Note on the Relaxation Time of Two Markov Chains on Rooted Phylogenetic Tree Spaces," Statistics & Probability Letters, 84:247-252, 2014.

\* cited by examiner

MODEL-ASSISTED EVALUATION AND INTELLIGENT INTERVIEW FEEDBACK

RELATED APPLICATIONS

This application is a continuation of U.S. patent application Ser. No. 15/613,901 filed Jun. 5, 2017, and entitled "MODEL-ASSISTED EVALUATION AND INTELLIGENT INTERVIEW FEEDBACK," which is a continuation of U.S. patent application Ser. No. 14/543,736, filed Nov. 17, 2014, and entitled "MODEL-ASSISTED EVALUATION AND INTELLIGENT INTERVIEW FEEDBACK," which claims the benefit of U.S. Provisional Application No. 61/928,308, filed Jan. 16, 2014, and entitled "MODEL-ASSISTED EVALUATION AND INTELLIGENT INTERVIEW FEEDBACK," the entire contents of which are incorporated herein by reference.

BACKGROUND

Finding and hiring employees is a task that impacts most modern businesses. It is important for an employer to find employees that "fit" open positions. Criteria for fitting an open position may include skills necessary to perform job functions. Employers may also want to evaluate potential employees for mental and emotional stability, ability to work well with others, ability to assume leadership roles, ambition, attention to detail, problem solving, etc.

However, the processes associated with finding employees can be expensive and time consuming for an employer. Such processes can include evaluating resumes and cover letters, telephone interviews with candidates, in-person interviews with candidates, drug testing, skill testing, sending rejection letters, offer negotiation, training new employees, etc. A single employee candidate can be very costly in terms of man-hours needed to evaluate and interact with the candidate before the candidate is hired.

Computers and computing systems can be used to automate some of these activities. For example, many businesses now have on-line recruiting tools that facilitate job postings, resume submissions, preliminary evaluations, etc. Additionally, some computing systems include functionality for allowing candidates to participate in "virtual" on-line interviews.

The job of interviewers and candidate reviewers is to determine if candidates are skilled and have the qualifications required for a particular job. In the process of doing this, they compare and contrast the qualifications of candidates—often reviewing and comparing candidate responses to particular questions or tasks. While computing tools have automated interview response gathering, there is still a lot of effort spent in evaluating the numerous responses that may be submitted in large quantities of applications for a single opening.

The subject matter claimed herein is not limited to embodiments that solve any disadvantages or that operate only in environments such as those described above. Rather, this background is only provided to illustrate one exemplary technology area where some embodiments described herein may be practiced.

BRIEF DESCRIPTION OF THE DRAWINGS

The present disclosure is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one.

FIG. 6 is an exemplary graphical user interface for viewing digital interviews after a review sequence operation according to one embodiment.

FIG. 8 is an exemplary graphical user interface for viewing digital interviews after a dynamic review sequence operation according to one embodiment.

FIG. 9 is an exemplary graphical user interface for viewing digital interviews after a dynamic review sequence operation according to one embodiment.

Figure 1:
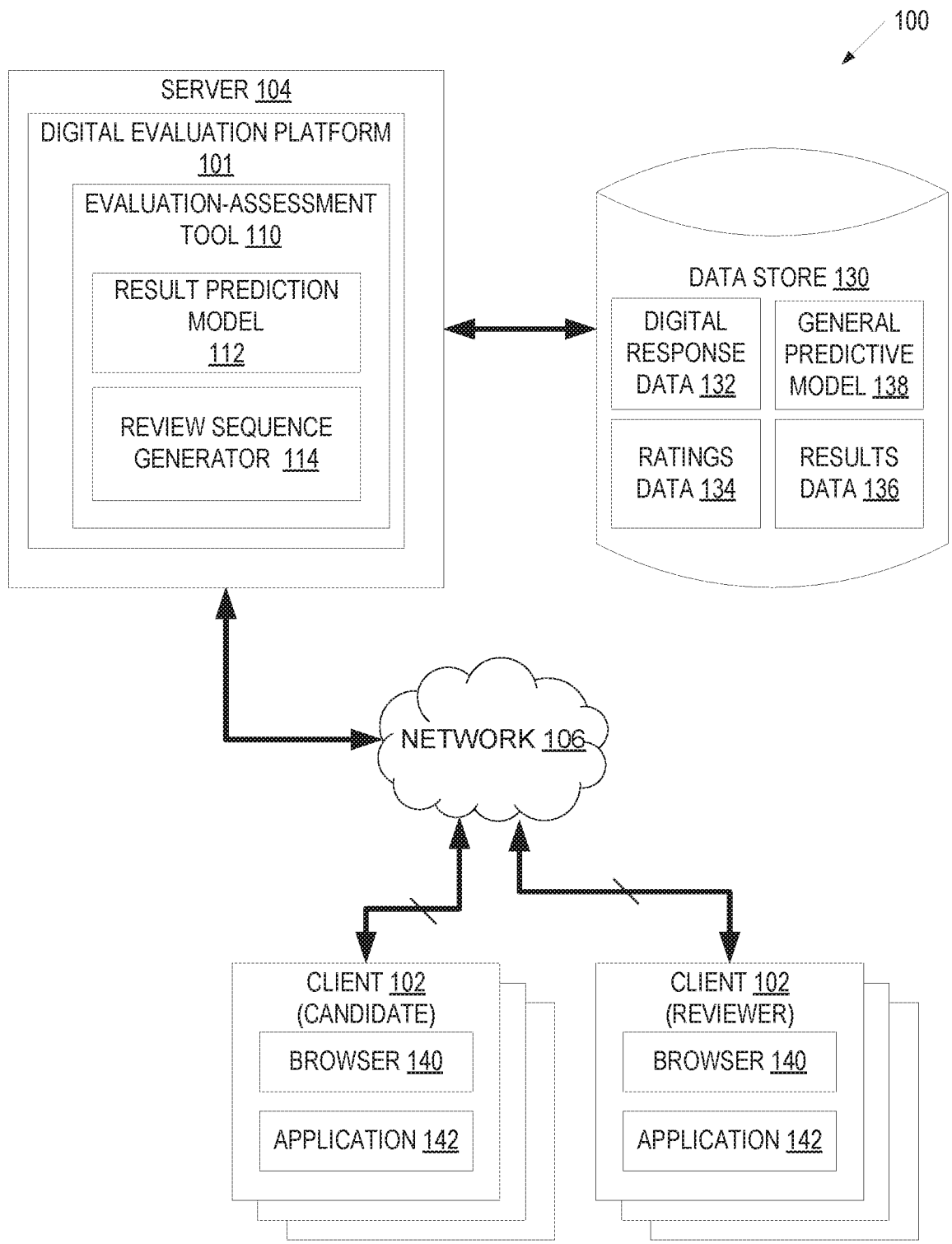
FIG. 1 is a block diagram of an exemplary network architecture in which embodiments of a model-assisted evaluation and intelligent interview feedback tool may operate.

Some aspects of these figures may be better understood by reference to the following Detailed Description.

DETAILED DESCRIPTION

Methods and systems for model-assisted evaluation and intelligent interview feedback to improve the reviewing of digital interviews and other digitally-capture evaluation processes are described. In the following description, numerous details are set forth. In one embodiment, a model-assisted evaluation and intelligent interview feedback tool (also referred to herein as an evaluation-assessment tool) selects a data set of digital response data for training. The data set includes evaluation data for evaluating candidates (also referred to herein as persons under evaluation). This evaluation data includes ratings of individual candidate responses to a series of prompts as well as an evaluation result, such as a hiring decision or recommendation, for each candidate. The evaluation-assessment tool analyzes the evaluation data to identify and model the relative importance or impact of each prompt to the evaluation result and applies the model to alter the sequence in which responses of candidates that have not yet been evaluated are reviewed. The predictive model may provide a one-time optimization of the reviewing sequence, and/or the predictive model may be used to update the reviewing sequence each time an evaluator rates a candidate's response. The model can be used to predict an evaluation result of a given candidate while the candidate is being evaluated by an evaluator. This evaluation result prediction may be updated with each new rating an evaluator provides for a person under evaluation.

In some instances in this description, well-known structures and devices are shown in block diagram form, rather than in detail, in order to avoid obscuring the embodiments of the present invention. It will be apparent, however, to one of ordinary skill in the art having the benefit of this disclosure, that embodiments of the present invention may be practiced without these specific details.

With the ability to recruit for positions nationally and even internationally using the Internet, the number of qualified candidates applying for a given job can be expensive and time consuming to evaluate. For more technical positions, subject-matter experts are used for evaluation and screening of candidates rather than focusing on regular job duties. With the adoption of digital video interviewing, the time needed to evaluate candidates is reduced, however, the problem of having too many candidates to filter through still remains.

Digital interviews or other evaluations, such as a pitch for investment funding or a grant, an admissions interview, job performance evaluations, or other presentation meriting assessment and comparison may include responding to a series of prompts or questions. The responses to those prompts by a person or group being evaluated, can be captured as digital data and later reviewed and rated by an evaluator. Because there are many candidates, a large data set is collected that includes the recorded responses for each candidate. When evaluators later view the recorded responses, the recorded responses may be viewed in the same sequence in which they were recorded. However, many of the earlier prompts in the series may be less useful in evaluating the candidate. For example, some of the earlier questions may include questions intended for the purpose of permitting the candidate to relax or become familiarized with the recording process. Because these prompts may elicit responses that are less well correlated with the evaluator's decision (represented in data as an evaluation result), reviewing these responses may decrease the efficiency and, potentially, the objectivity of the evaluation result. Additionally, at the outset of a hiring campaign or other evaluation campaign, it may not be clear which prompts will be the most useful in assessing the candidates. By identifying which questions are the most strongly correlated with the evaluation result or most strongly predict the evaluation result, the time spent evaluating candidates may be directed to reviewing the recorded responses of many candidates to those prompts. Relatedly, by identifying the paths through an evaluation process, an evaluation result prediction may be provided to an evaluator and updated with each rating. This may assist the evaluator in confirming the evaluator's decision, allowing the evaluator to terminate the evaluation with confidence. As described herein a predictive model may be developed and used to re-order the recorded responses in a manner that presents the responses to a strongly correlated question before the responses to less strongly correlated questions. The responses being correlated to an evaluation result.

Thus, embodiments described herein can be used to address at least two identified problems of candidate selection, namely large candidate pools and increased screening accuracy. The embodiments described herein provide solutions to these problems by identifying an optimal reviewing sequence so that the candidate pool may be efficiently and correctly narrowed after reviewing a smaller number of recorded responses. The predictive model used to provide the optimal reviewing sequence may further provide a prediction of an evaluation result for a person being evaluated (referred to herein as an evaluation result prediction) to provide evaluators with added confidence in their assessments. The evaluation result prediction can be updated as the evaluator rates responses. In order to determine the optimal reviewing sequence and the prediction of an evaluation result, a historical data set is gathered over time. The historical data set includes ratings and evaluation results of multiple candidates. The embodiments described herein describe building a predictive model using the historical data set, training the predictive model, and using the predictive model to sort responses for efficient review and to provide an evaluation result prediction.

FIG. 1 is a block diagram of a network architecture 100 in which embodiments of an evaluation-assessment tool 110 may operate. The network architecture 100 may include multiple client computing systems 102 coupled to a server computing system 104 via a network 106 (e.g., a public network such as the Internet, a private network such as a local area network (LAN), or a combination thereof). The network 106 may include the Internet and network connections to the Internet. Alternatively, the server 104 and the client 102 may be located on a common LAN, personal area network (PAN), campus area network (CAN), metropolitan area network (MAN), wide area network (WAN), wireless local area network, cellular network, virtual local area network, or the like. The server computing system 104 (also referred to herein as server 104) may include one or more machines (e.g., one or more server computer systems, routers, gateways) that have processing and storage capabilities to provide the functionality described herein. The server computing system 104 may execute an a predictive model, referred to herein as an evaluation-assessment tool 110. The evaluation-assessment tool 110 can perform various functions as described herein and may include an evaluation result prediction model 112 for predicting the evaluation result for candidates and review sequence generator 114, as described in more detail below with respect to FIGS. 2-4.

The evaluation-assessment tool 110 can be implemented as a part of a digital evaluation platform 101, such as the digital interviewing platform developed by HireVue, Inc., or may be implemented in another digital evaluation platform such as an investment evaluation platform or an admission evaluation platform. While many of the examples provided herein are directed to an employment/hiring context, the principles and features disclosed herein may be equally applied to other contexts and so such are within the scope of this disclosure as well. For example, the principles and features provided herein may be applied to a job performance evaluation, an evaluation of a sales pitch, an evaluation of an investment pitch, etc.

The evaluation-assessment tool 110 can be implemented as a standalone predictive model that interfaces with the digital evaluation platform 101 or other systems. It should also be noted that in this embodiment, the server computing system 104 implements the evaluation-assessment tool 110, but one or more of the clients may also include client modules of the evaluation-assessment tool 110 that can work in connection with, or independently from the functionality of the evaluation-assessment tool 110 as depicted on the server computing system 104.

The client computing systems 102 (also referred to herein as "client 102") may each be a client workstation, a server, a computer, a portable electronic device, an entertainment system configured to communicate over a network, such as a set-top box, a digital receiver, a digital television, a mobile phone, a smart phone, a tablet, or other electronic devices. For example, portable electronic devices may include, but are not limited to, cellular phones, portable gaming systems, wearable computing devices or the like. The client 102 may have access to the Internet via a firewall, a router or other packet switching devices. The clients 102 may connect to the server 104 through one or more intervening devices, such as routers, gateways, or other devices. The clients 102 are variously configured with different functionality and may include a browser 140 and one or more applications 142. The clients 102 may include a microphone and a video camera to recorded responses as digital data. For example, the clients 102 may record and store video responses and/or stream or upload the recorded responses to the server 104 for capture and storage. In one embodiment, the clients 102 access the digital evaluation platform 101 via the browser 140 to record responses. The recorded responses may include audio, video, digital data, such as code or text, or combinations thereof. In such embodiments, the digital evaluation platform 101 is a web-based application or a cloud computing system that presents user interfaces to the client 102 via the browser 140.

Similarly, one of the applications 142 can be used to access the digital evaluation platform 101. For example, a mobile application (referred to as "app") can be used to access one or more user interfaces of the digital evaluation platform 101. The digital evaluation platform 101 can be one or more software products that facilitate the digital evaluation process. For example, in some cases, the client 102 is used by a candidate (or interviewee) to conduct a digital interview. The digital evaluation platform 101 can capture digital response data 132 from the candidate and store the data in a data store 130. The digital response data 132 may include data uploaded by the candidate, audio captured during the interview, video captured during the interview, data submitted by the candidate before or after the interview, or the like. As illustrated herein, the digital response data 132 includes at least recorded response in the form of video captured during the interview.

The clients 102 can also be used by a reviewer or evaluator to review, screen, and select candidates and their associated response data. The reviewer can access the digital evaluation platform 101 via the browser 140 or the application 142 as described above. The user interfaces presented to the reviewer by the digital evaluation platform 101 are different than the user interfaces presented to the candidates. The user interfaces presented to the reviewer permit the reviewer to access the digital response data 132 for reviewing and selecting the candidates. The evaluation-assessment tool 110 can be selectively activated by the reviewer (or automatically activated when so configured) to sort recorded responses in an optimal reviewing order or sequence, provide evaluation result predictions, to sort candidates for ordering a list of candidates, screening a list of candidates, or for other reviewing purposes.

The data store 130 can represent one or more data repositories on one or more memory devices. The data store 130 may be a database or any other organized collection of data. The data store 130 may store the digital response data 132, evaluation ratings data 134, evaluation result data 136, and a general predictive model 138 from which both the result prediction model 112 and the review sequence generator 114 may be derived.

In the depicted embodiment, the server computing system 104 may execute the digital evaluation platform 101, including the evaluation-assessment tool 110 for sorting recorded responses in an optimal reviewing sequence and predicting evaluation results. The server 104 can include web server functionality that facilitates communication between the clients 102 and the digital evaluation platform 101 to conduct digital interviews or review digital interviews, including recorded responses, as described herein. Alternatively, the web server functionality may be implemented on a machine other than the machine running the evaluation-assessment tool 110. It should also be noted that the functionality of the digital evaluation platform 101 for recording the digital response data 132 can be implemented on one or more servers 104 and the functionality of the digital evaluation platform 101 can be implemented by one or more different servers 104. In other embodiments, the network architecture 100 may include other devices, such as directory servers, website servers, statistic servers, devices of a network infrastructure operator (e.g., an ISP), or the like. Alternatively, other configurations are possible as would be appreciated by one of ordinary skill in the art having the benefit of this disclosure.

Figure 2:
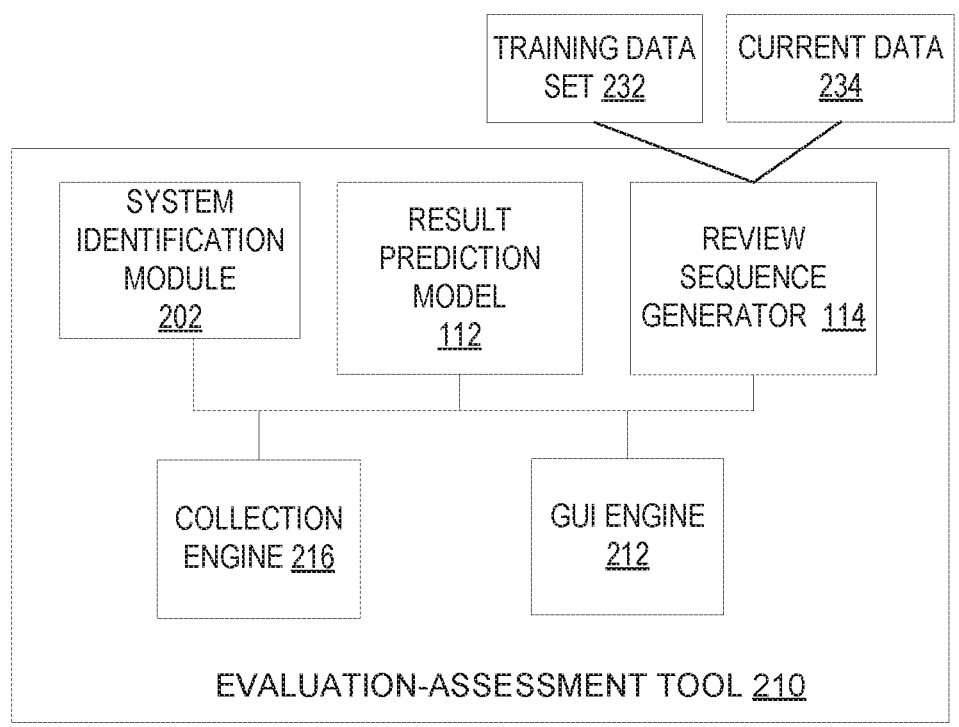
FIG. 2 is a block diagram of a model-assisted evaluation and intelligent interview feedback tool according to one embodiment.

FIG. 2 is a block diagram of an evaluation-assessment tool 210 according to one embodiment. The evaluation-assessment tool 210 can be implemented as processing logic comprising hardware (circuitry, dedicated logic, etc.), software (such as is run on a general purpose computing system or a dedicated machine), firmware (embedded software), or any combination thereof. In the depicted embodiment, the evaluation-assessment tool 210 includes a system identification module 202, the result prediction model 112, review sequence generator 114, a communication module 208, a graphical user interface (GUI) engine 212, and a collection engine 216. The components of the evaluation-assessment tool 210 may represent modules that can be combined together or separated into further modules, according to some embodiments. For example, the result prediction model 112 and the review sequence generator 114 may be provided by a single module such as a general predictive model in some embodiments. Such a general predictive model for sorting recorded responses into an optimal review sequence and providing an evaluation result prediction may be expressed by Equation (1) as seen below:

$$y = F(r) \tag{1}$$

In Equation (1), F may represent a function (e.g., a linear function, a non-linear function, a custom algorithm, etc.), y is an evaluation result for a candidate, and r is a vector of ratings with a length ranging from 1 to n, where n is the total number of prompts in the evaluation. The function F may handle a dynamic vector length, so that an evaluation result prediction may be calculated as additional ratings are entered by an evaluator. Given a sufficient quantity of y and r data, the function F may be modelled to enable the prediction of ay from a given r. Other components may be included in some embodiments of the evaluation-assessment tool 210 in providing this general predictive model.

Before the evaluation-assessment tool 210 is used in connection with current data 234 (e.g., recorded responses that have not yet been rated by an evaluator), the evaluation-assessment tool 210 can develop and train the result prediction model 112 and the review sequence generator 114, provided by the function F. In some embodiments, the review sequence generator 114 uses the prediction model 112 to generate an optimized review sequence. To build the result prediction model 112 and the sequence generator 114, the evaluation-assessment tool 210 obtains a training data set 232 of historical ratings data and historical evaluation result data. Thus, the training data set 232 may be understood as an evaluated data set, in that in contains data, ratings and result data, from previously performed evaluations of candidates. This training data set may be provided by the collection engine 216 as the ratings and results are provided to the digital evaluation platform 101 from one of the clients 102. Ratings and evaluation result data may be collected by the collection engine 216 first as current data. For example, during the evaluation of a candidate, the evaluator may view a first recorded response and provide a rating for the response, before viewing a second recorded response, providing another rating, etc. At the end of the evaluation, the evaluator enters an evaluation result (e.g., yes, no, maybe, advance to next round, etc.). Once the evaluation result is provided by the evaluator, the ratings and the evaluation result for that candidate may be moved from the current data to the training data set 232, where the added data may be used in computer-learning procedures to improve the sequence generator 114 and the result prediction model 112.

For example, at the beginning of an evaluation, no ratings are entered. After the first recorded response is viewed and a rating (e.g., a numerical value from 1 to 5) is entered, a ratings vector r may be created with the first rating. The vector r=[4] is the ratings vector after one rating is entered, with 4 as the rating. As more recorded responses are viewed and rated by the evaluator, the vector r increases. For example, after the next rating r becomes [4 3], after another rating r becomes [4 3 2], and so on until all the responses have been evaluated resulting in a complete ratings vector r=[4 3 2 5 2 3 1 4]. This example has eight recorded responses to eight prompts, i.e. n=8 in this instance. During an evaluation process, the function F produces results as seen in the following Equations (2), (3), and (4):

$$y_1 = F([4]) \quad (2)$$

$$y_2 = F([43]) \quad (3)$$

$$y_8 = F([43252314]) \quad (4)$$

In which, where $y_1$ represents the evaluation result prediction after receiving a 4 on the first prompt, $y_2$ represents the candidate prediction after receiving a 4 on the first prompt and a 3 on the second prompt, and $y_8$ equals the candidate prediction based on the entire scoring sequence by the evaluator. The evaluation result prediction may be expressed as a percentage or a probability of a particular evaluation result occurring, such as a "yes" or another favorable decision. This percentage or probability may thus be mapped to a verbal evaluation result or recommendation.

During training of the function F, after all the ratings have been received and an evaluation result y has also been received from the evaluator, the vector r and the value y may be moved from current data 234 to training data set 232. The accumulation of vectors r provides for the formation of a ratings matrix R as seen in Equation (5) below.

$$R = \begin{bmatrix} 4 & 3 & 2 & 5 & 2 & 3 & 1 & 4 \\ 1 & 3 & 1 & 5 & 2 & 1 & 5 & 5 \\ 3 & 1 & 4 & 3 & 2 & & 4 & 6 \\ 2 & & 3 & & 5 & & 1 & 2 \\ \vdots & \vdots & \vdots & \vdots & \vdots & \vdots & \vdots & \vdots \end{bmatrix} \quad (5)$$

As shown above in ratings matrix R, a row in the matrix is associated with a single candidate and is composed of the ratings for that candidate. The ratings matrix R may have dimensions p×n, where p is the number of candidates in a candidate pool and n is the total number of prompts. In some instances, the matrix R may include a sparse data set, meaning that ratings may not have been provided by the evaluator for every recorded response. In other instances, the collection engine 216 may require that ratings for every recorded response be provided; partially full ratings vectors may be discarded from the training data set 232. In some embodiments, the collection engine 216 may provide an estimated value for use in any blanks in the ratings matrix. This estimated value may be determined per candidate such that the value may be an average of the actual ratings received for a given candidate, or the estimated value for all candidates may be the average of all the entered ratings in the ratings matrix. In other embodiments, other methods may be used to provide the missing ratings in the ratings matrix.

Entered evaluation results y for a plurality of candidates provide for the formation of an evaluation results vector Y as shown in Equation (6) below.

$$Y = \begin{bmatrix} \text{yes} \\ \text{no} \\ \text{no} \\ \text{maybe} \\ \vdots \end{bmatrix} = \begin{bmatrix} 3 \\ 1 \\ 1 \\ 2 \\ \vdots \end{bmatrix} \quad (6)$$

As shown above, the evaluation results vector Y may be first provided in verbal form and then converted by the collection engine 216 to a numeral format. As used herein a "yes" maps to 3, a "maybe" maps to 2, and a "no" maps to 1. Other values may be used in some embodiments. For example, an evaluation result of "maybe" may map to 0.5, or an evaluation result of "yes" may map to 4. Different weightings may be provided in different embodiments within the scope of this disclosure. Additionally, each time an evaluation is completed, the additional ratings vector and evaluation result may be added to the ratings matrix R and the evaluation results vector Y in the training set data 232.

Using this data collected by the collection engine 216, the system identification module 202 builds the general predictive function F to provide the result prediction model 112 and the review sequence generator 114 using the ratings matrix R and the evaluation results vector Y. After a modeling function F is created, the function F may generate a ratings vector and output an evaluation result prediction.

In some embodiments, the function F may be a sequence dependent function, while in other embodiments it may be a sequence independent function. If the function F is sequence independent, the ordering of the questions in the ratings matrix R may not alter the weight a question receives in assessing its effectiveness at sorting candidates. Such sequence independent functions and models may include regression functions, random forest functions, support vector machines (SVM), etc. By using the function F, the prompts and the corresponding recorded responses may be sorted according to how predictive they are of the evaluation result. Once this ordering is identified, the review sequence generator 114 may provide the optimized review sequence to an evaluator through a user interface provided by the GUI engine 212. Using the review sequence, an evaluator may review the recorded responses of a candidate in order of how correlated those recorded responses are to the evaluation's decision.

When the function F is a sequence dependent function, the function F effectively receives the ratings matrix R as an input and further receives R in a specific order. Because the order in which the columns of R are received affects the weighting of the prompts, the training of the general predictive model F (providing the result prediction model 112 and the review sequence generator 114) may include operations to assess the results for each possible sequence of columns. Because the result prediction model 112 and the review sequence generator 114 may be provided by the general predictive model or function F, references herein to training the function F may also be understood as training the result prediction model 112 and the review sequence generator 114. In some embodiments, optimization may be performed in order to train the function F without evaluating results of every possible sequence, but with only a subset of the possible sequences. In this optimization problem, the objective is to reduce the number of questions needed to achieve a decision in the function F. In other words, the optimization may include determining how effectively each prompt splits a pool of candidates for which there are ratings data and evaluation result data. For example, the prediction model 112 may begin with one column of the ratings matrix R and then grow the data set operated on by one column in an iterative manner. The resulting vectors may be combined to produce an outcome or result matrix. The effectiveness of a question may be assessed by counting the number of candidates in each column that have been classified. In some embodiments, the classification may be as "yes" or "maybe" if the confidence is above 99% and "no" if the confidence is less than 1%. Other values may be used in other embodiments.

Figure 3:
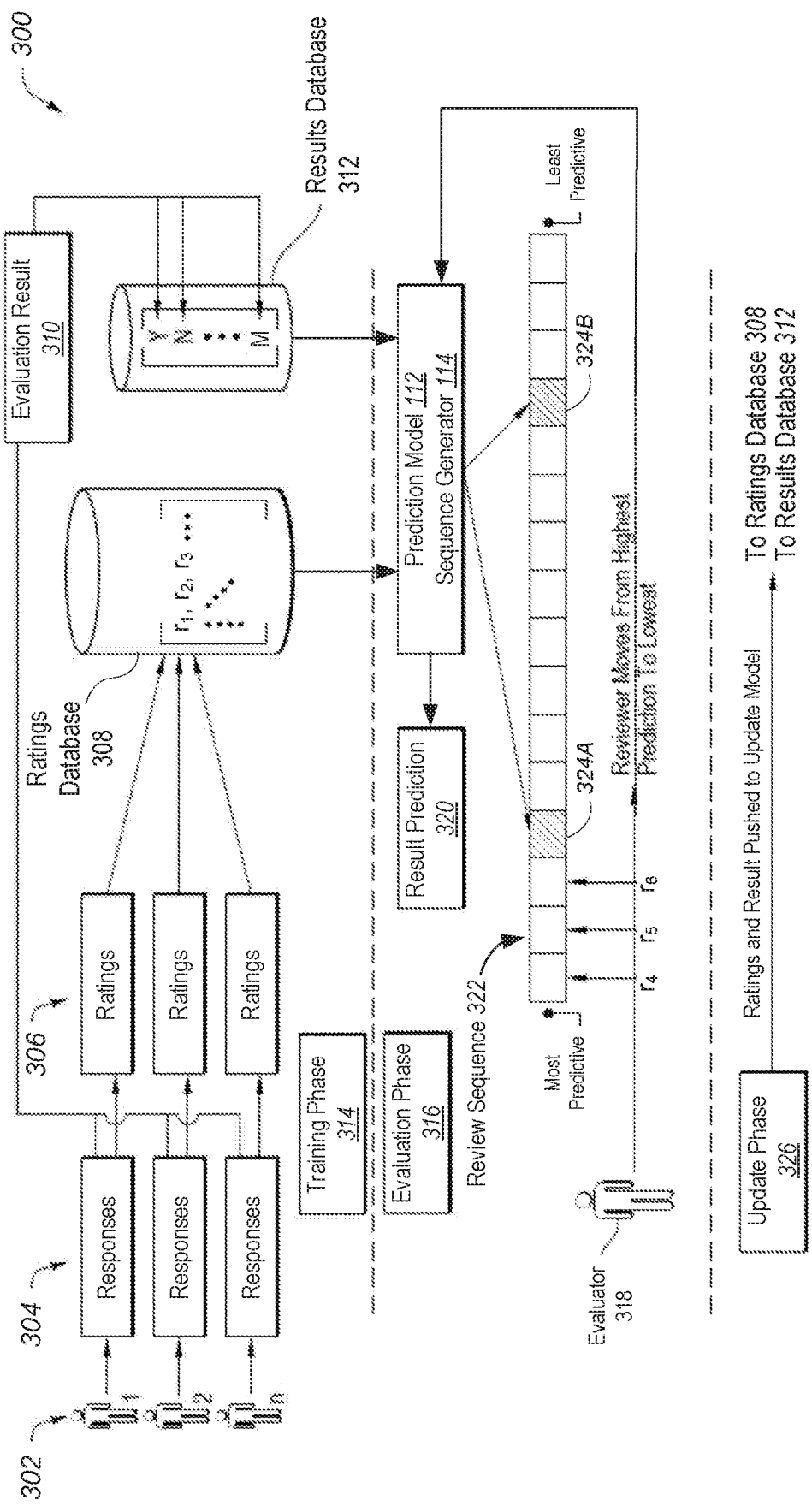
FIG. 3 illustrates operational phases of model-assisted evaluation and intelligent interview feedback according to one embodiment.

FIG. 3 is a process flow 300 showing the operational phases of the system 100 of FIG. 1. As shown in FIG. 3, a multiple candidates 302 each record a set of responses 304 which is stored in a data store and rated by one or more evaluators. For example, the responses may be recorded as part of an interview process to be rated by a human resources person or another person having responsibility for hiring decisions or recommendations. When the evaluator reviews the responses 304, the evaluator provides ratings 306 for the responses. These ratings 306 are stored in a ratings database 308, with ratings for one candidate in a first row, ratings for another candidate in a second row, etc., with each row having one or more ratings. Additionally, the evaluator may provide an evaluation result 310, such as yes, no, or maybe, for each of the plurality of candidates. In some embodiments, the evaluation result 310 may be provided as a quantified result, while in other embodiments "yes," "no", and "maybe" responses may be quantified by the system 100. The evaluation result 310 may then be stored in a results database 312. The ratings for a given candidate may not be used in the absence of a corresponding evaluation result. In some embodiments, evaluation-assessment tool 210 may require the evaluator to enter a rating for every response. In other embodiments, the evaluator may not rate every response. Until a threshold amount of evaluated candidate information (e.g., ratings and evaluation result) is collected and available, the information is used to train the result prediction model 112 and sequence generator 114 as part of a training phase 314.

During an evaluation phase 316, an evaluator 318 may evaluate the recorded responses of an additional candidate that is under evaluation using the digital-evaluation platform 101 of FIG. 1. During the evaluation process, the evaluator 318 may receive an evaluation result prediction 320 from the result prediction model 112. The evaluation result prediction 320 provides an estimate of whether or not the additional candidate is likely to receive a "yes" as an evaluation result. Before the evaluator 318 has rated any of the additional candidate's recorded responses, the result prediction model 112 may use the information from the results database 312 to offer a preliminary result prediction based simply on the ratio of "yesses" to the total number of evaluation results present in the results database 312. In other embodiments, other ways of calculating the preliminary result prediction may be employed.

The sequence generator 114 uses the ratings from the ratings database 308 and the evaluation results from the results database 312 to determine an optimal review sequence 322 in which to review the recorded responses of the additional candidate. This review sequence 322 orders the recorded responses from the most predictive to the least predictive in order to minimize the time and effort required to evaluate the additional candidate. Thus, the recorded response 324A may have occurred after the recorded response 324B at the time the candidate recorded his responses, e.g. the prompt that elicited the recorded response 324B preceded the prompt that elicited the recorded response 324A in the interview. However, the result prediction model 112 and the sequence generator 114 determine that recorded response 324A is more predictive than the recorded response 324B. Accordingly, the recorded response 324A may be presented sooner to the evaluator 318 in the evaluation process. Thus, the result prediction model 112 and the sequence generator 114 may identify which prompts elicit the responses that are most predictive of whether or not a candidate receives a favorable or unfavorable evaluation result.

While the evaluator 318 is evaluating the additional candidate, the evaluator 318 may provide a rating for the first recorded response in the reviewing sequence 322 before moving on to the second recorded response, etc. When the evaluator enters the rating $r_4$, the rating is provided to the result prediction model 112. The result prediction model 112 may use the rating $r_4$ to update the evaluation result prediction 320 to reflect the performance of the additional candidate on the first prompt. If the rating $r_4$ indicates the additional candidate performed well, the evaluation result prediction 320 may increase. Conversely, if the rating $r_4$ indicates the additional candidate performed poorly, the evaluation result prediction 320 may decrease. Because the recorded responses of the additional candidate have been reordered into the review sequence 322, the impact of a favorable or unfavorable response to the first prompt may have a greater impact on the evaluation result prediction 320 that comparable ratings received for the response to the second prompt. Thus, the result prediction model 112 may provide and update the evaluation result prediction 320 with each new rating received from the evaluator 318. In some embodiments, the review sequence 322 is optimized with or without the display and updating of the evaluation result prediction 320.

When the evaluator 318 enters an evaluation result, the evaluation phase 316 may terminate and an update phase 326 may begin. During the update phase 326, the ratings for the additional candidate ($r_4$, $r_5$, $r_6$, etc.) and the evaluation result ("yes", "no", "maybe", etc.) are provided to the ratings database 308 and the results database 312, respectively. This additional data may then be used in another training phase 314 to update the result prediction model 112 and the review sequence generator 114. After which, yet another candidate may be evaluated in another evaluation phase 316.

Figure 4:
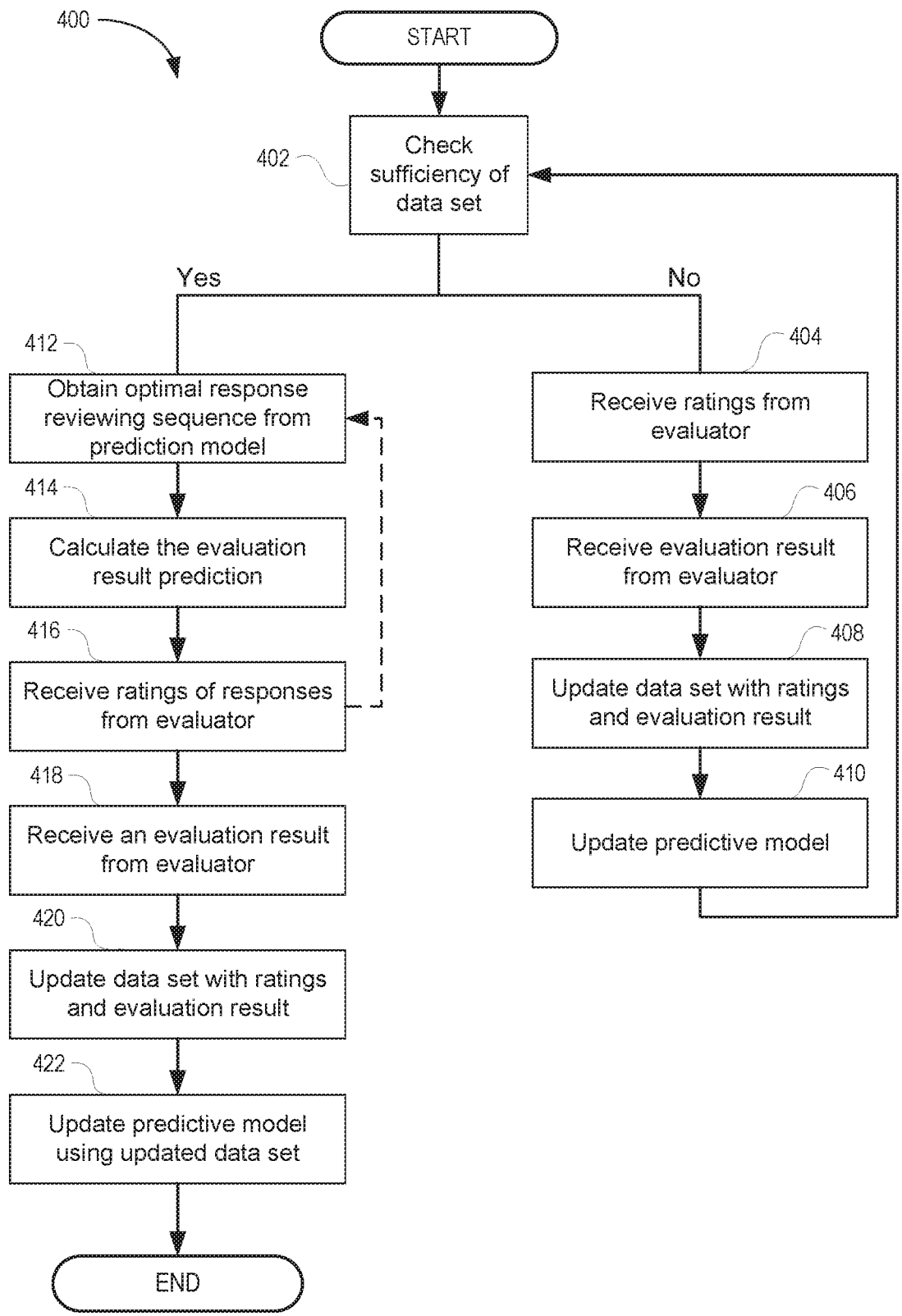
FIG. 4 is a flow diagram of a method of providing model-assisted evaluation and intelligent interview feedback according to one embodiment.

FIG. 4 is a flow diagram illustrating a method 400 for facilitating the evaluation of a plurality of candidates in an evaluation process. The method 400 may be performed by processing logic that comprises hardware (e.g., circuitry, dedicated logic, programmable logic, microcode, etc.), software (e.g., instructions run on a processing device to perform hardware simulation), or a combination thereof.

For simplicity of explanation, the method 400 and other methods of this disclosure may be depicted and described as a series of acts or operations. However, operations in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on a non-transitory, tangible, computer-readable medium to facilitate transporting and transferring such methods to computing devices.

Thus, FIG. 4 illustrates an embodiment of the method 400, which begins at block 402 in which the processing logic checks the sufficiency of the historical evaluation data. This historical evaluation data may include ratings data, such as from the ratings database 308 of FIG. 3, and evaluation results data, such as from the results database 312. The sufficiency of the historical evaluation data may be determined by checking the quantity of data against a threshold value. In some instances, multiple thresholds may be employed in assessing the sufficiency of the historical evaluation data, with the multiple thresholds corresponding to varying degrees of confidence in the predictions provided by the result prediction model 112 and sequence generator 114. Thus, the result prediction model 112 and/or the sequence generator 114 may be used to check whether there is enough data to use. Some checks of the historical evaluation data may also determine whether the data is of a required quality. For example, if the evaluators' or an evaluator's ratings were random, the quality of predictions based upon the data may be such that an evaluator may not want to rely on them or use them. Accordingly, statistical analysis may be applied to assess the historical evaluation data both in terms of its quantity and in terms of its quality before a function F is computed.

If the historical evaluation data is determined to be inadequate, the method 400 may continue to block 404 in which the processing logic receives ratings from the evaluator. Because an optimized review sequence may not be generated reliably the review sequence generator 114, the evaluator may rate recorded responses in the order in which the responses were recorded or in a manually configured order. For example, the evaluator or a person overseeing the evaluation process may be able to manually select an order for review other than the order of recording. Additionally, an evaluation result prediction may not be provided to the evaluator. The evaluator may continue to review recorded responses and enter ratings until there are no more recorded responses for the person then under review or until the evaluator enters an evaluation result.

At block 406, an evaluation result is received from the evaluator. The evaluation result may be quantized value derived from a "yes", a "no", a "maybe", an "advance to the next round", or another such evaluation result. The evaluation result may be a recommendation rather than a decision. In some embodiments, recommendations from multiple evaluators may be used in conjunction to make ultimate evaluation decisions, such as whether to hire a particular candidate or whether to invest in a pitched opportunity. At block 408, the processing logic may collect the ratings and the evaluation result received from the evaluator and update the historical data set with the ratings and result. This may increase the quantity and/or quality of the historical data set, which may make it sufficient for use by the predictive model. Accordingly, at block 410, the predictive model (the function F) is updated by the processing logic. This may include the operations discussed above in connection with FIGS. 2 and 3, in order to prepare the result prediction model 112 and the sequence generator 114 for use in facilitating the efficient evaluation of additional candidates when they are under evaluation. If the historical data set does not pass the check at block 402, the method 400 may return to block 404 for the evaluation of another candidate.

When the historical data set is determined to be sufficient for use in prediction and recommendation, the method 400 continues to block 412, at which the processing logic obtains an optimal reviewing sequence from the predictive model. The optimal reviewing sequence is a sequence in which responses are ordered and presented to an evaluator according to their correlation with a favorable evaluation result. This predictive model may include the sequence generator 114 as shown in FIGS. 2 and 3. The reviewing sequence may be similar to the reviewing sequence 322 of FIG. 3 in that it orders the recorded responses in an optimized sequence that is different than the sequence in which the responses were recorded. This optimized sequence may correspond to the ranking of the prompts in capacity to sift through the candidates as quickly as possible. In some embodiments, a final review sequence may include a modified version of the optimized sequence. For example, the responses to certain prompts may be forced to the beginning of the review sequence, without respect to their correlation to a favorable evaluation result.

At block 414, the processing logic calculates the evaluation prediction result. For example, the result prediction model 112 may use the ratings from the ratings database 308 and the evaluation results from the results database 312 to predict whether the person under evaluation will receive a favorable evaluation result. When no ratings have been received from the evaluator for any of the recorded responses of the person under evaluation, the evaluation result prediction may be based on the number of candidates receiving a favorable result divided by the total number of candidates reviewed. After at least one rating has been received, the rating may also be factored into the prediction evaluation result by the result prediction model 112.

At block 416, the processing logic receives one or more ratings of one or more recorded responses of the person under evaluation. In some embodiments, as is discussed later in more detail, upon receiving a rating at block 416, the method may return to block 412.

At block 418, the processing logic receives an evaluation result from the evaluator. This operation may be similar to that described in connection with block 406 above. At block 420, the historical data set is updated by the processing logic with the ratings and the evaluation result received from the evaluator. After the historical data set is updated to include the ratings and evaluation result of the most recently evaluated candidate, the predictive model is updated by the processing logic at block 422. This update may include updating the result prediction model 112 and the review sequence generator 114.

Figure 5:
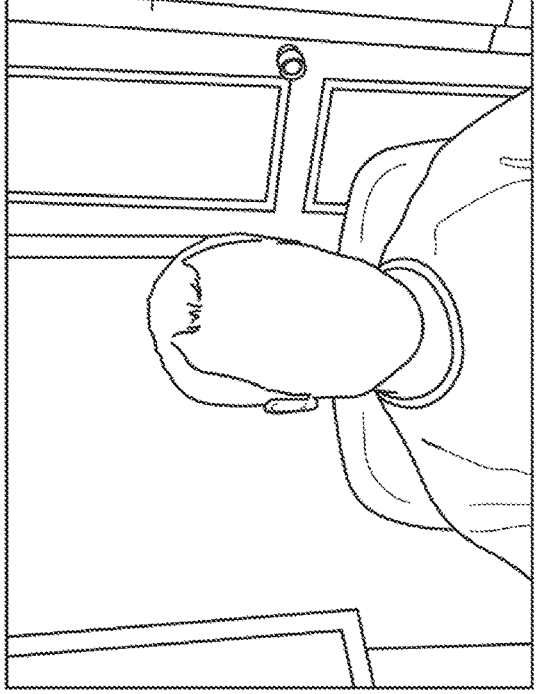
FIG. 5 is an exemplary graphical user interface for viewing digital interviews according to one embodiment.

FIG. 5 is an exemplary user interface 500 for viewing digital evaluations without using an optimized review sequence according to one embodiment. The user interface 500 may be an evaluation view 502 of a digital evaluation platform 101. The evaluation view 502 includes candidate information 504, a prompt element 506, a prompt navigation element 508 (which displays an ordering of the recorded responses in a sequence 509), a video panel 510, a list of candidates 512, and a filter element 514. The list of candidates 512 can be filtered and/or sorted by first name, last name, time, education, or other variables. The evaluation view 502 of the user interface 500 also includes a decision prediction element 516 that displays an evaluation result prediction as described herein. As illustrated, the decision prediction element 516 displays an evaluation result prediction of 15%, meaning that there is a 15% chance the person under evaluation (e.g., "Ben Thomas") will receive a favorable evaluation result. As the evaluator views the recorded response associated with prompt 1 and enters a rating for the recorded response, the decision prediction element 516 may be updated to reflect a recalculated evaluation result prediction.

The evaluation view 502 further includes a sequence optimization element 518, by which an evaluator may select one of multiple sequence optimization settings. As shown in FIG. 5, an evaluator may select an "Off" setting, an "Optimize (Static)" setting, and an "Optimize (Dynamic)" setting. Some embodiments may not include all of the illustrated settings, while other embodiments may include additional settings. As illustrated in FIG. 5, the "Off" setting is selected in the sequence optimization element 518. When the "Off" setting is selected, the recorded responses for "Ben Thomas" may be played to the evaluator in the order in which the responses were recorded. Thus, the prompt navigation element 508 displays prompts 1 through 7 in their recorded order. Prompt 1 is displayed in the prompt element 506 so that the evaluator may be aware of the prompt that elicited the recorded response being reviewed.

Figure 6:
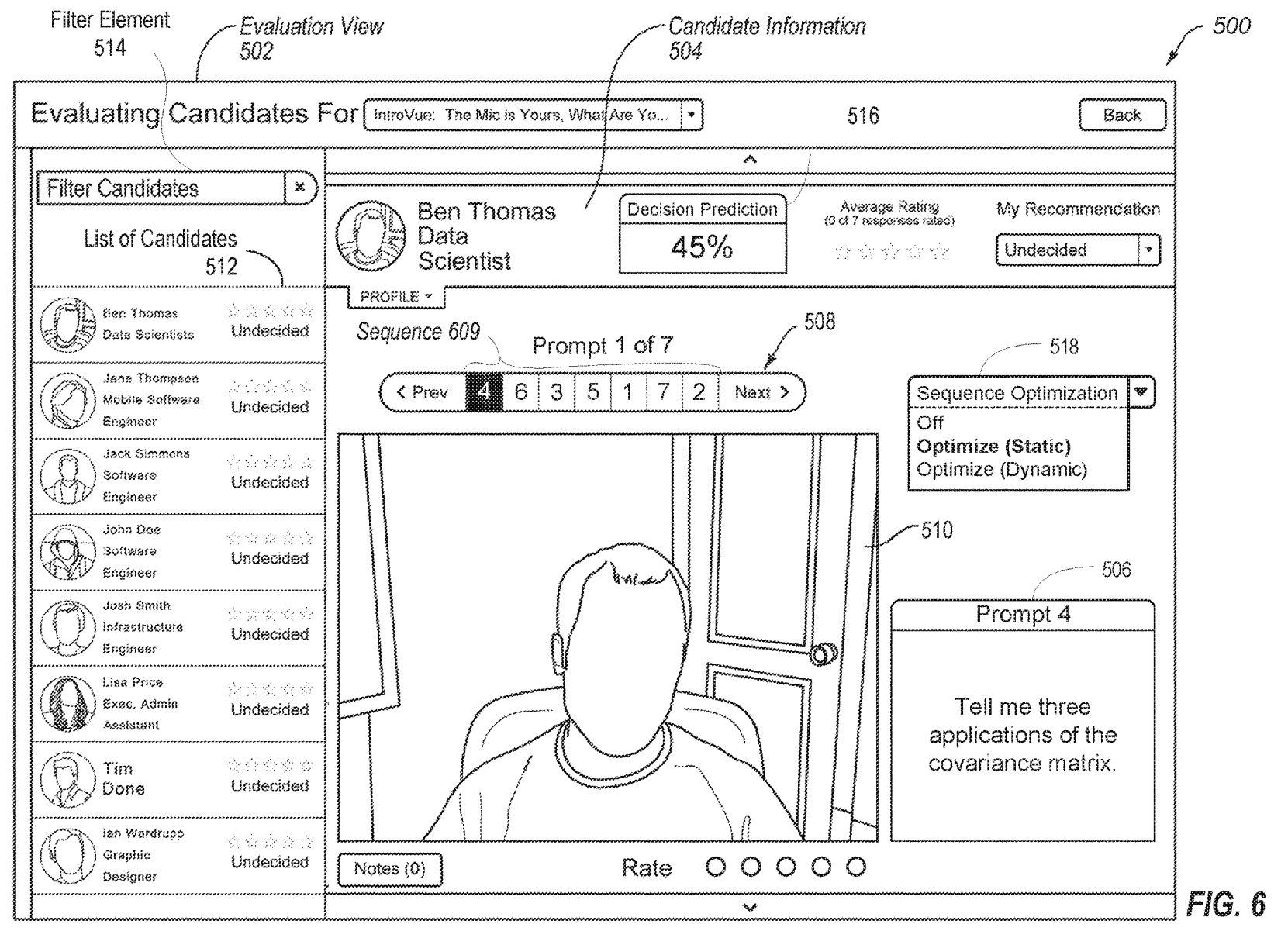

FIG. 6 presents the evaluation view 502 when the evaluator has used the sequence optimization element 518 to select to "Optimize (Static) setting. Using the sequence generator 114 and the result prediction model 112, the digital evaluation platform 101 determines the optimal review sequence. By viewing the recorded responses in the optimal review sequence, the evaluator may be able to rate the most predictive recorded response (or the recorded responses to the most predictive prompts) first, followed by the next most predictive recorded response, etc. As shown in FIG. 6, the prompt navigator element 508 shows the optimized review sequence. Whereas before the review sequence was "1, 2, 3, 4, 5, 6, and 7", the optimized review sequence presents the recorded responses to prompts 4, 6, 3, 5, 1, 7, and then 2 in an optimized sequence 609. The prompt element 506 is also updated to display prompt 4, "Tell me three applications of the covariance matrix," which the sequence generator 114 determined to be the most predictive prompt. After the evaluator provides a rating of 4 out of 5 for the candidate's response to prompt 4, the decision prediction element 516 displays an updated evaluation result prediction for "Ben Thomas." The evaluation prediction of 65% indicates that 65% of the candidates who received a rating of 4 out of 5 on prompt 4 eventually received a favorable evaluation result. Because the "Optimize (Static)" setting is selected in FIG. 6, the review sequence 609 as shown in prompt navigation element 508 may not change or be updated in response to receiving the rating from the evaluator for the response to prompt 4. As discussed herein, in some embodiments, the review sequence may be modified to include certain responses earlier in the review sequence. For example a response to an introduction-type prompt may be forced to the beginning of the review sequence even though it may be less predictive. Such modifications may be specified by the evaluator. For example, the evaluator may specify that the response to prompt 1 is always included first in the review sequence, such that the modified review sequence presents the recorded responses to prompt 1 and then 4, 6, 3, 5, and 7.

Figure 7:
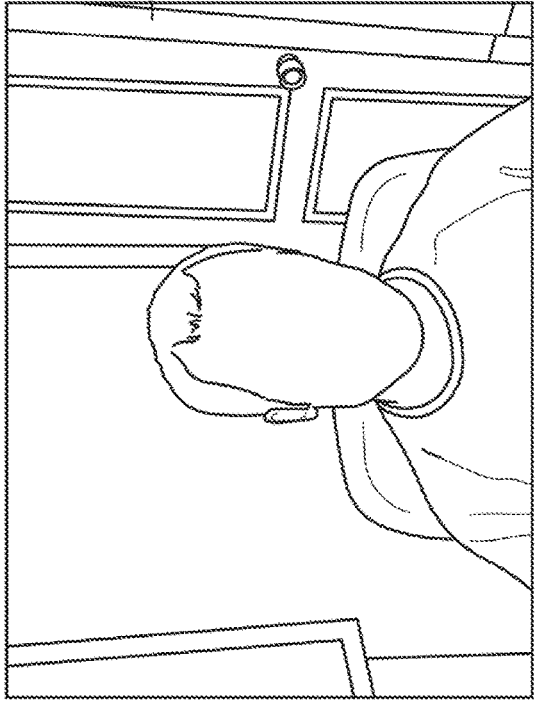
FIG. 7 is an exemplary graphical user interface for viewing digital interviews after a review sequence operation according to another embodiment.

FIG. 7 illustrates the evaluation view 502 after the evaluator has entered the rating of the recorded response to prompt 4. When a rating is entered for a recorded response, the evaluator may select the "Next" button in the prompt navigation element 508 to be able to observe the next recorded response. In some embodiments, upon entering a rating, the prompt navigation element 508 may automatically proceed to the next prompt and corresponding recorded response in the sequence 609. As shown in FIG. 7, with the "Optimize (Static)" setting selected, the next prompt for which is recorded response is to be reviewed is prompt 6. The recorded response of the candidate under review is then displayed in the video panel 510. After the rating of each recorded response is entered, the evaluation result prediction in the decision prediction element 516 and the next recorded response may be viewed until all responses have been rated by the evaluator and/or the evaluator enters an evaluation result. With the "Optimize (Static)" option selected, the recorded response will be viewed in the optimize review sequence "4, 6, 3, 5, 1, 7, and 2" as shown in FIGS. 6 and 7. The sequence may not be updated based on any of the ratings received during the evaluation of "Ben Thomas."

Figure 8:
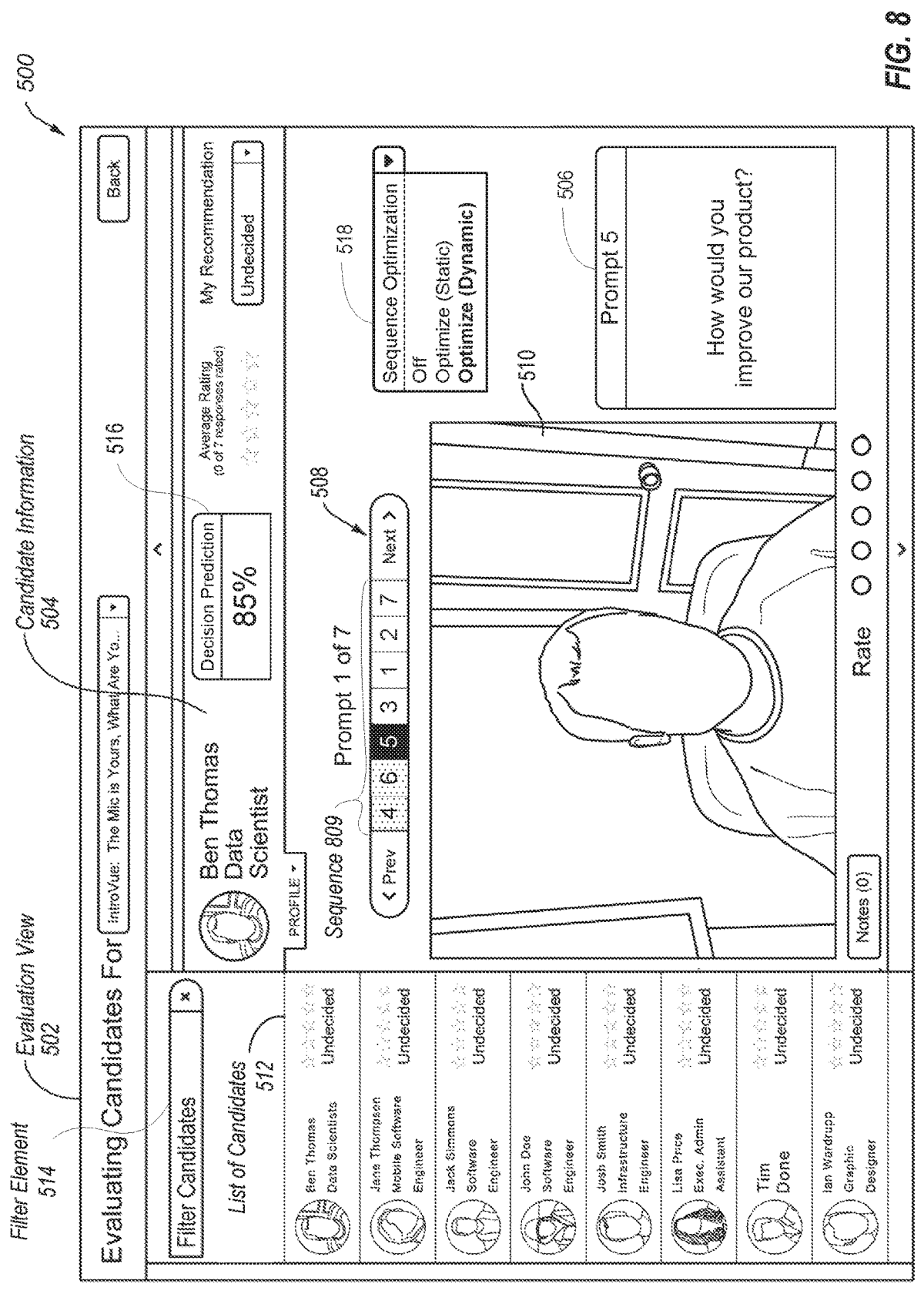

FIG. 8 illustrates the evaluation view 502 with the "Optimize (Dynamic)" setting selected in the sequence optimization element 518. After the rating of 4 out of 5 stars is received by the digital evaluation platform 101, the result prediction model 112 and the review sequence generator 114 may be used to provide both an updated evaluation prediction (as also seen in FIG. 7) and an updated review sequence as seen in the prompt navigation element 508. In FIGS. 6 and 7, the optimized review sequence was "4, 6, 3, 5, 1, 7, 2." Because the static optimization option was selected, the optimized review sequence 609 was not updated using the rating received in evaluating the recorded response to prompt 4. Because the "Optimize (Dynamic)" setting is selected, after each rating is received, the review sequence is re-optimized, optimized so as to account for the entered rating. As shown in FIG. 8, after a rating is entered for the recorded response to prompt 6, the remaining prompts may be reordered again in a new optimized review sequence 809 that takes the evaluator's rating of the recorded response to prompt 6 into consideration. Thus, while the previous optimized review sequence was "4, 6, 3, 5, 1, 7, 2," the newly optimized review sequence is illustrated as "4, 6, 5, 3, 1, 2, 7." After a rating is received for the recorded response to prompt 5, the review sequence may be recalculated again by the review sequence generator 114, and so forth. In some instances, a recalculation of the review sequence may not provide any reordering of the recorded responses. However, in some situations a particular rating for one recorded response may be offset by a rating on another particular recorded response. Accordingly, the particular recorded response may be reviewed next in the sequence to efficiently evaluate the candidate. Thus, recalculating the optimal review sequence after each rating is received may be particularly advantageous where there is a path dependence in the evaluation result.

Figure 9:
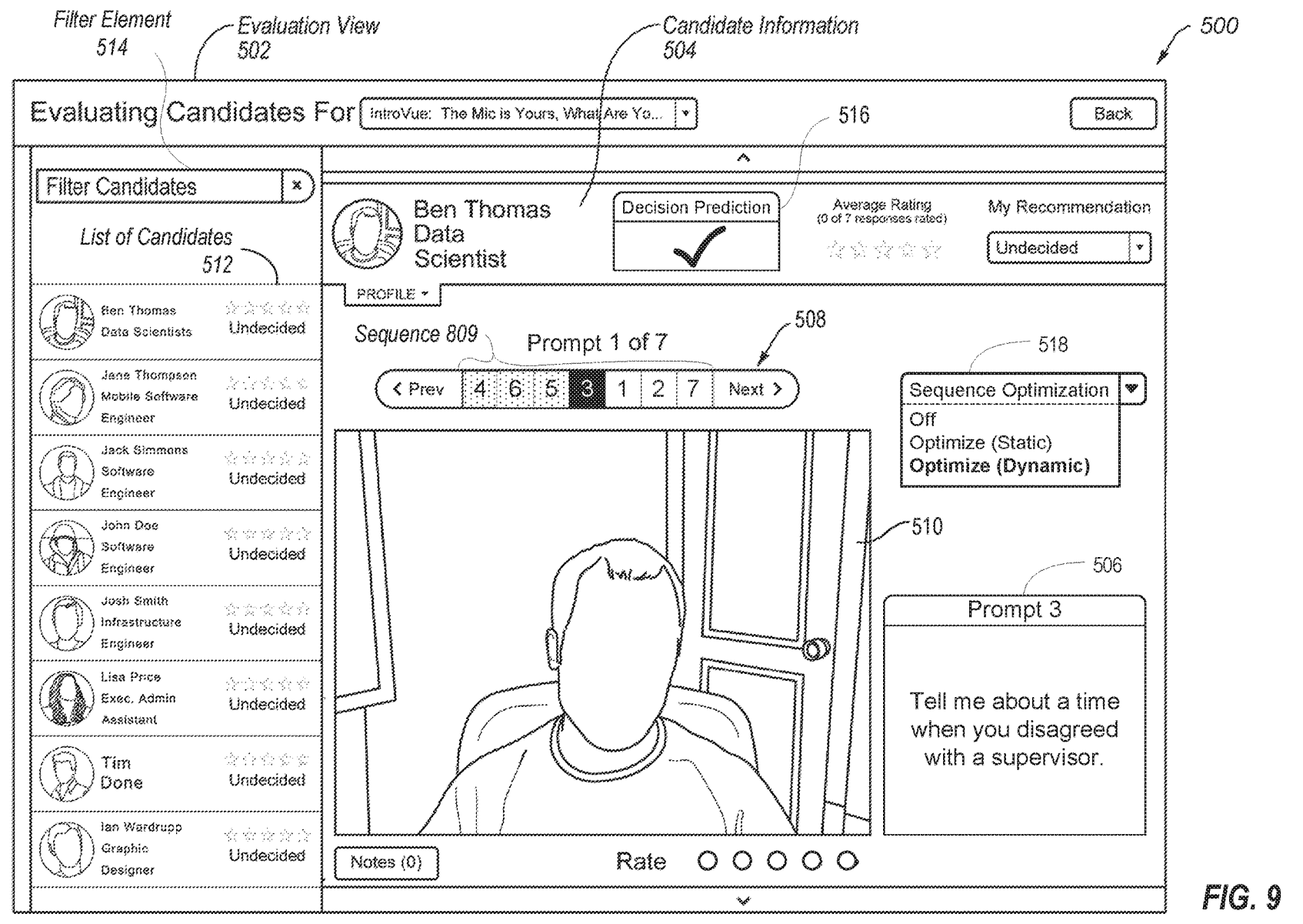

FIG. 9 is another illustration of the exemplary user interface 500. As shown in FIG. 9, another rating has been entered. The evaluator rated the response to prompt 5 and is now presented in the response to prompt 3 as the video 510. However, as shown in the decision prediction element 516, a non-numerical indication is presented to communicate to the reviewer that the evaluation-assessment tool 110 is predicting a favorable result for the person being evaluated. The favorable result is being predicted with a probability that is higher than a set threshold, such as 95%. The evaluator may choose to continue viewing the recorded responses and entering additional ratings, or the evaluator may use the evaluation result prediction to confidently enter an evaluation result, effectively ending the review of the responses of the person under evaluation. This indication is thus provided to the evaluator to allow the evaluator to confidently end an evaluation prior to rating every recorded response. This may allow the evaluator to evaluate candidates more efficiently, while maintaining confidence in the evaluation process.

Figure 10A:
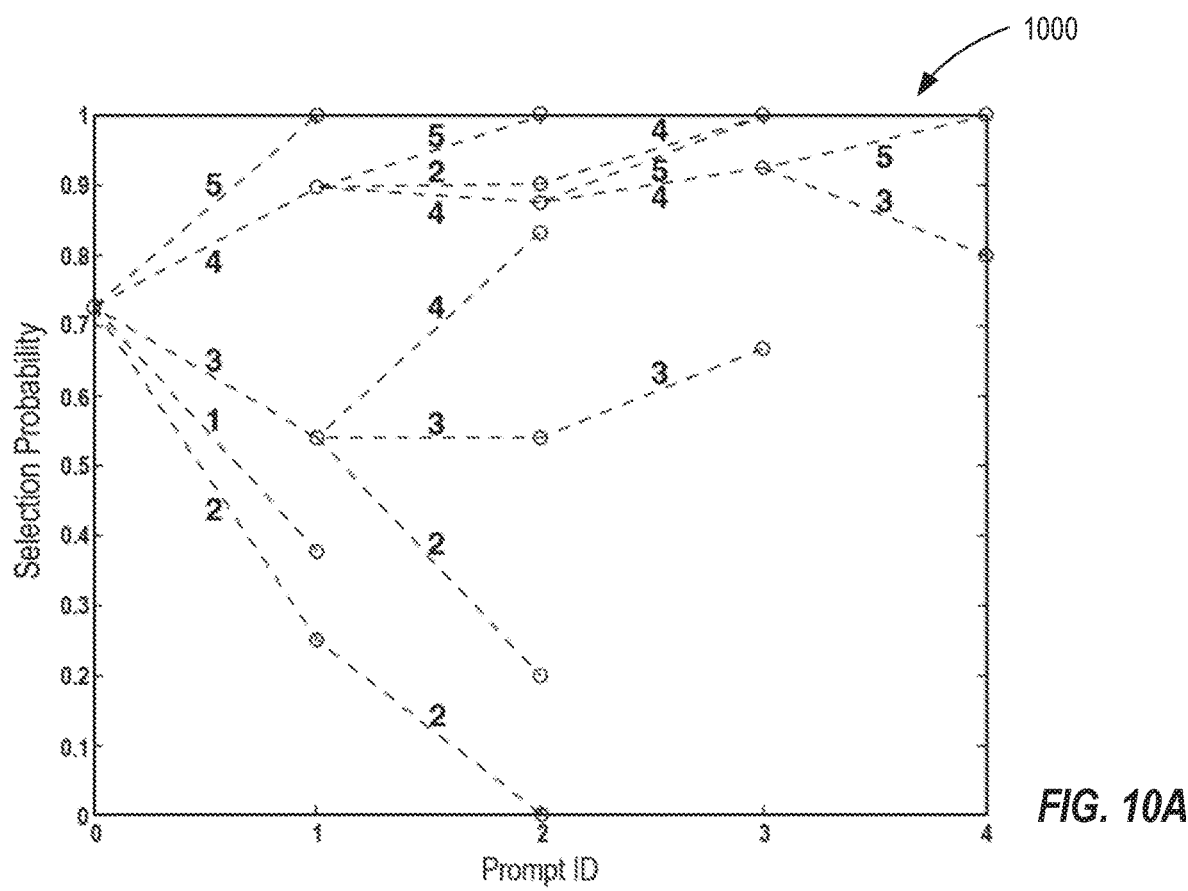
FIG. 10A is a plot of a data set of probabilities of an individual in receiving a favorable evaluation result according to one embodiment.

FIGS. 10A-12B provide additional information regarding how the general predictive model F may be calculated. FIGS. 10A and 10B are diagrams showing evaluation paths. The evaluation paths follow a candidate from the beginning of the evaluation process to the end in a tree format. To provide the predictive model F, each node in the tree may be weighted. For example, the historical data, i.e. ratings matrix R and evaluation result vector Y may be used in constructing a historical probability tree. FIG. 10A shows a data set that illustrates the probabilities of an individual receiving a favorable evaluation result according to various evaluation paths. However, the data set shown in FIG. 10A is limited and may provide insufficient observation to accurately calculate the probabilities as the tree develops more layers.

To compensate for the limited observations of certain ratings sequences, a likelihood coefficient matrix may be built to facilitate extrapolation. The coefficient matrix C may be formed by looping through each prompt q and rating v as shown in Equation (7) shown below, $$C(q, v) = \frac{count(y(R(:, q) == v) == 3 | 2)}{countRows(R)} \quad (7)$$

where R(:,q)==v is selecting all the indexes or rows in the rating matrix R, where the q column is equal to the rating v. Once a logical index vector is available, the logical index vector is piped into the evaluation result vector y, and set equal to 2 or 3 (assuming 2 is assigned to "maybe" and 3 is assigned to "yes"). The final outcome is the ratio of the number of times a rating of "yes" or "maybe" occurred relative to the total number of occurrences or rows in rating matrix R. As shown in FIG. 10A, the plot 1000 illustrates the probabilities of an individual being selected for "yes" or "maybe", i.e. a favorable evaluation result. Clusters of at least a threshold number of individuals, such as 5 individuals, are chosen for estimating probabilities. However, for some individuals there may be a limited number of observation, sometimes even only one observation, of the consecutive scoring and future observations may need to be extrapolated.

An example of the coefficient matrix C is provided in Equation (8) as seen below:

$$C = \begin{bmatrix} 0.0690 & 0.4330 & 0.7115 & 1.0 & \\ 0.1290 & 0.4925 & 0.7033 & 1.0 & \\ 0 & 0.3889 & 0.7111 & 0.9231 & 1.0 \\ 0.1111 & 0.2344 & 0.7957 & 0.9474 & \\ 0 & 0.3778 & 0.8246 & 0.8571 & \\ 0 & 0.4286 & 0.7532 & 0.8750 & \\ 0.1429 & 0.3438 & 0.7667 & 0.9500 & \\ 0 & 0.5 & 0.8387 & 0.8571 & \\ 0 & 0.4828 & 0.7105 & 0.8 & 0.5 \\ 0.1111 & 0.4600 & 0.7794 & 1 & \\ 0.3214 & 0.4737 & 0.7885 & 1 & \\ 0.1471 & 0.6034 & 0.8 & 1 & 1.0 \end{bmatrix} \quad (8)$$

In some instances, the evaluators or an evaluator may not give every rating for recorded responses to all the prompts in the evaluation. As shown above, in Equation (8) the rating of 5 has not been given for recorded responses to certain prompts. However, ratings from 1-4 have been given on all other questions. To address the missing data problem the coefficient matrix C may use two-dimensional interpolation and extrapolation to allow missing data items, like scores of 5, to be populated with values greater or equal to those present where ratings are equal to 4. In some embodiments, the prompt order can be sorted, prior to interpolation, to address the randomness of the prompts. The reordering or sorting may be driven by the slope across the rating system, which could cluster questions that are more decisive.

The adjusted coefficient matrix $C_{adjusted}$ may be represented by Equation (9) as show below:

$$C_{adjusted} = \begin{bmatrix} 0.0690 & 0.4330 & 0.7115 & 1.0 & 1.0 \\ 0.1290 & 0.4925 & 0.7033 & 1.0 & 1.0 \\ 0 & 0.3889 & 0.7111 & 0.9231 & 1.0 \\ 0.1111 & 0.2344 & 0.7957 & 0.9474 & 0.99 \\ 0 & 0.3778 & 0.8246 & 0.8571 & 0.96 \\ 0 & 0.4286 & 0.7532 & 0.8750 & 0.96 \\ 0.1429 & 0.3438 & 0.7667 & 0.9500 & 0.99 \\ 0 & 0.5 & 0.8387 & 0.8571 & 0.90 \\ 0 & 0.4828 & 0.7105 & 0.8 & 0.8 \\ 0.1111 & 0.4600 & 0.7794 & 1.0 & 1.0 \\ 0.3214 & 0.4737 & 0.7885 & 1.0 & 1.0 \\ 0.1471 & 0.6034 & 0.8 & 1.0 & 1.0 \end{bmatrix} \quad (9)$$

Using the adjusted coefficient matrix, a vector can be constructed based on each historical evaluation path. For example, a single row from the review matrix R has R(1,:)=[3, 5, 4, 1, 3, 3, 4, 2, 2, 3, 4, NA], where NA represents a missing value. Using the corresponding ratings and prompt, a vector may be constructed out of values from the adjusted coefficient matrix $C_{adjusted}$. Using this example, the probability vector $Prob_j$ for candidate j may be as follows, $$Prob_j = \begin{bmatrix} C_{1,3} \\ C_{2,5} \\ C_{3,4} \\ C_{4,3} \\ C_{5,1} \\ C_{6,3} \\ C_{7,3} \\ C_{8,4} \\ C_{9,2} \\ C_{10,2} \\ C_{11,3} \\ C_{12,4} \end{bmatrix} = \begin{bmatrix} 0.7115 \\ 1.0 \\ 0.9231 \\ 0.7957 \\ 0 \\ 0.8387 \\ 0.7667 \\ 0.8571 \\ 0.4828 \\ 0.4600 \\ 0.7885 \\ 1 \end{bmatrix} \quad (10)$$

where the missing value is replaced with an estimate value (e.g. a replacement value) based on the rest of the candidate responses. In this example, the value of 1.0 for a 4 star rating is used because the candidate scored considerably higher on the rest of their questions. The replacement value may be selected on the assumption that candidates with lower than normal probabilities may be likely to have a lower occurrence than candidates with a higher than normal probability. The probability value for the first prompt may be correct, but is then averaged cumulatively as more prompts are responded to.

Figure 10B:
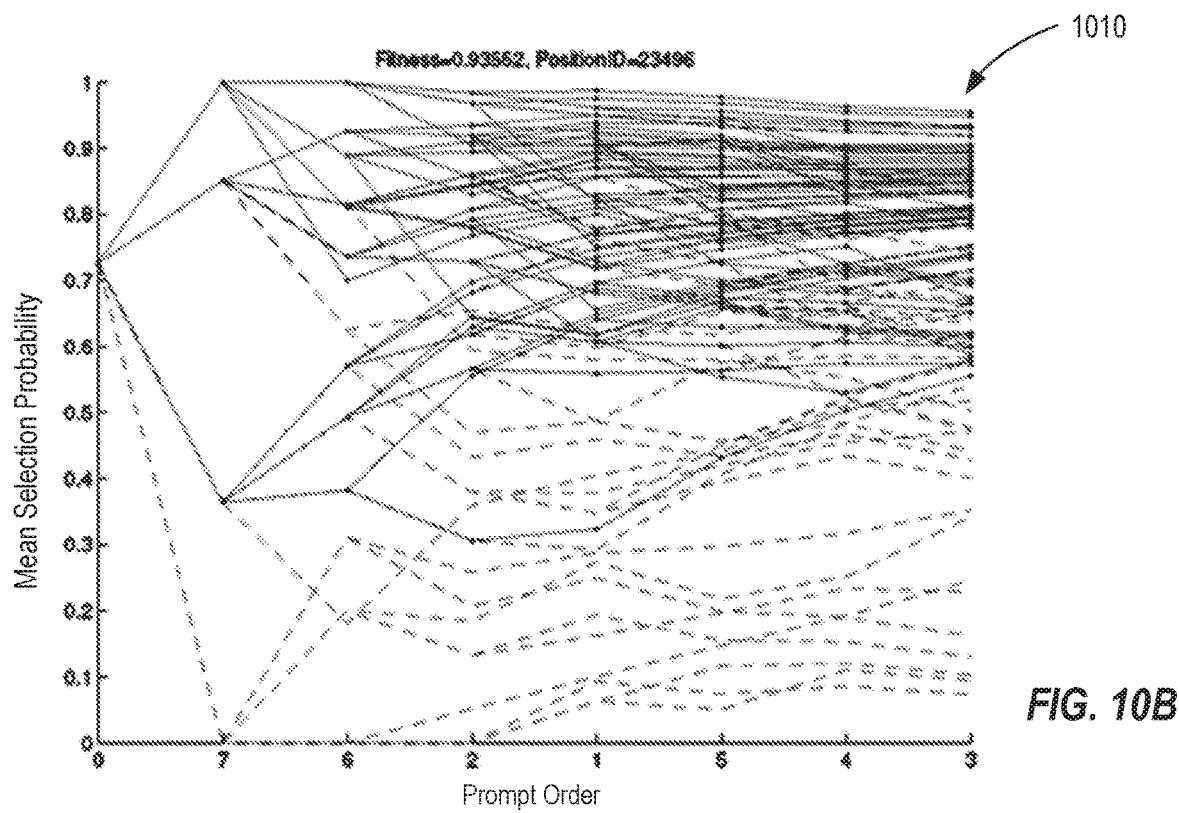
FIG. 10B is an estimated plot according to one embodiment.

Shown in FIG. 10B is an estimated plot 1010. The plot 1010 demonstrates clustering between "yes" (solid-lines) and "no" (dashed-lines) candidates using the cumulative mean going from left to right. As discussed, individuals with lower averages relative to others are assumed to be less likely to receive a favorable evaluation result. As illustrated in plot 1010, the probability values after the first prompt may simply be means of the historical probability vector $Prob_j$, and thus may not reflect true probabilities yet. To become closer to true probabilities further adjustments may be required.

Figure 11:
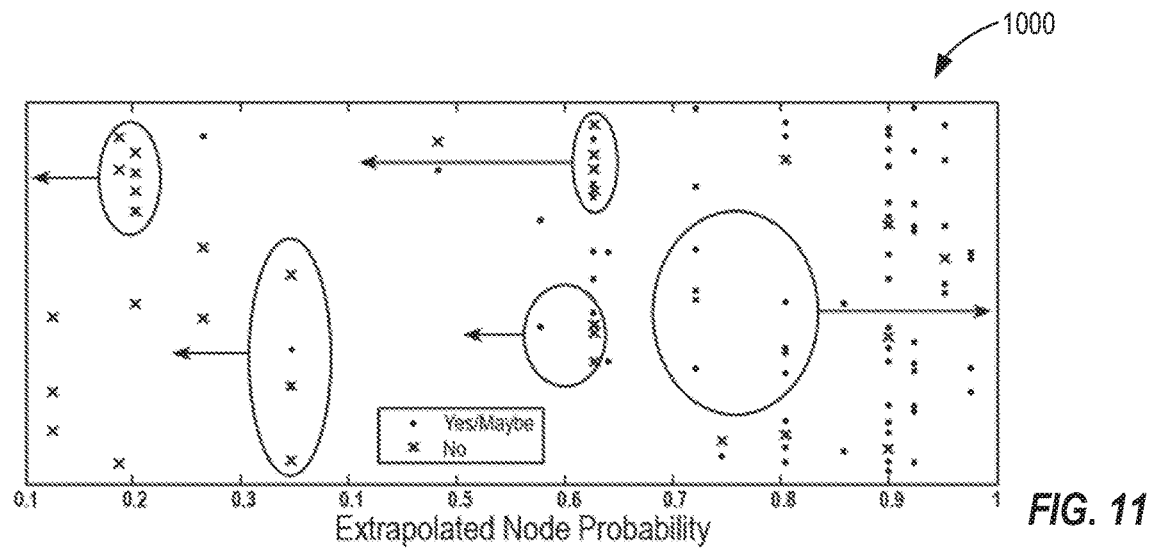
FIG. 11 is a diagram illustrating stochastic adjustment on a specific prompt according to one embodiment.

FIG. 11 is a diagram 1100 illustrating an example of stochastic adjustment on a specific prompt. Clusters of similarly valued points may be used to compute historical probabilities based on the cluster, and the points may be adjusted to reflect more accurate probabilities. Thus, in some embodiments, stochastic clustering adjustments may be used to determine the correct probabilities on the sequential points. A small random cluster of neighboring points (according to the initial estimated probability using the cumulative mean) may be selected and the historical probability for the cluster is calculated. Then the points may be shifted towards the new value. Repeating this adjustment may facilitate convergence to a more accurate representation of the probabilities. In some embodiments, the adjustment may be repeated thousands of times.

After the stochastic adjustment is completed, the previously classified "yes" and "no" clustering seen in FIG. 11 becomes expanded to fit the boundaries. These new points may be more accurate for the tree probabilities using the stochastic clustering adjustment technique. For a few prompt ratings sequences there may be exact probability numbers where sufficient observations are present. This could be more likely on the first few question combinations. For example, when 10 candidates have a rating of 3 on the first prompt and a score of 2 on the second prompt, this small group can be studied to predict a more accurate probability.

Figure 12A:
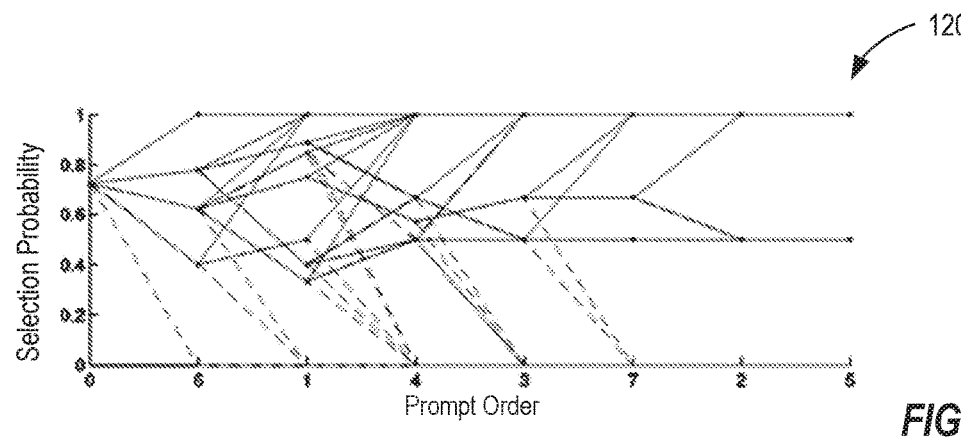
FIG. 12A illustrates a knock-out model according to one embodiment.
Figure 12B:
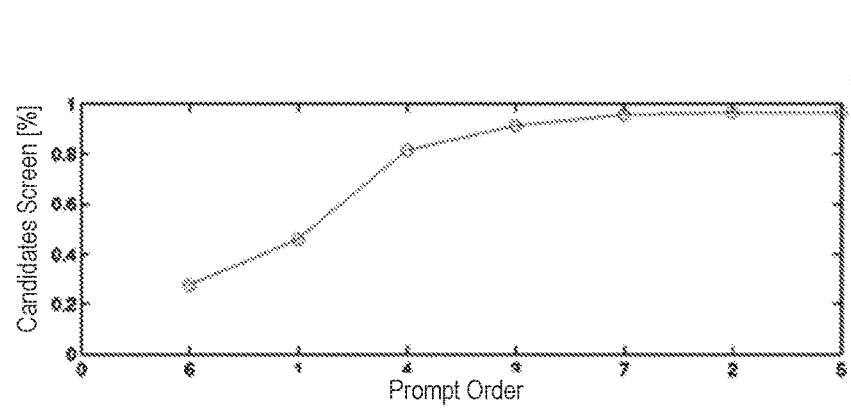
FIG. 12B is a graph showing the efficacy of the knock-out model according to one embodiment.

FIGS. 12A and 12B demonstrate estimated probabilities for different candidates based on the historical data set from evaluations of earlier candidates. FIG. 12A illustrates a knock-out model 1200 for how a candidate may progress through an evaluation to either a favorable evaluation result or an unfavorable one. FIG. 12B is a plot 1210 showing the efficacy of the knock-out model 1200. As seen in FIG. 12B, after the third prompt in the review sequence is rated (prompt 4), about 80% of the candidates have been effectively screened, been assigned an evaluation prediction result according to the knock-out model 1200. After the fourth prompt in the review sequence is rated, about 90% of the candidates have been screened. Thus, by reviewing the recorded responses in an optimized order, an evaluator may come to an evaluation result earlier without decreasing the effectiveness of the evaluation. Evaluating the recorded responses to the remaining prompts may provide little additional screening benefits. To allow an evaluator to benefit from the efficient screening of candidates, the evaluation result prediction is displayed in the decision prediction element 508 of FIGS. 5, 6, 7, 8, and 9.

Figure 13:
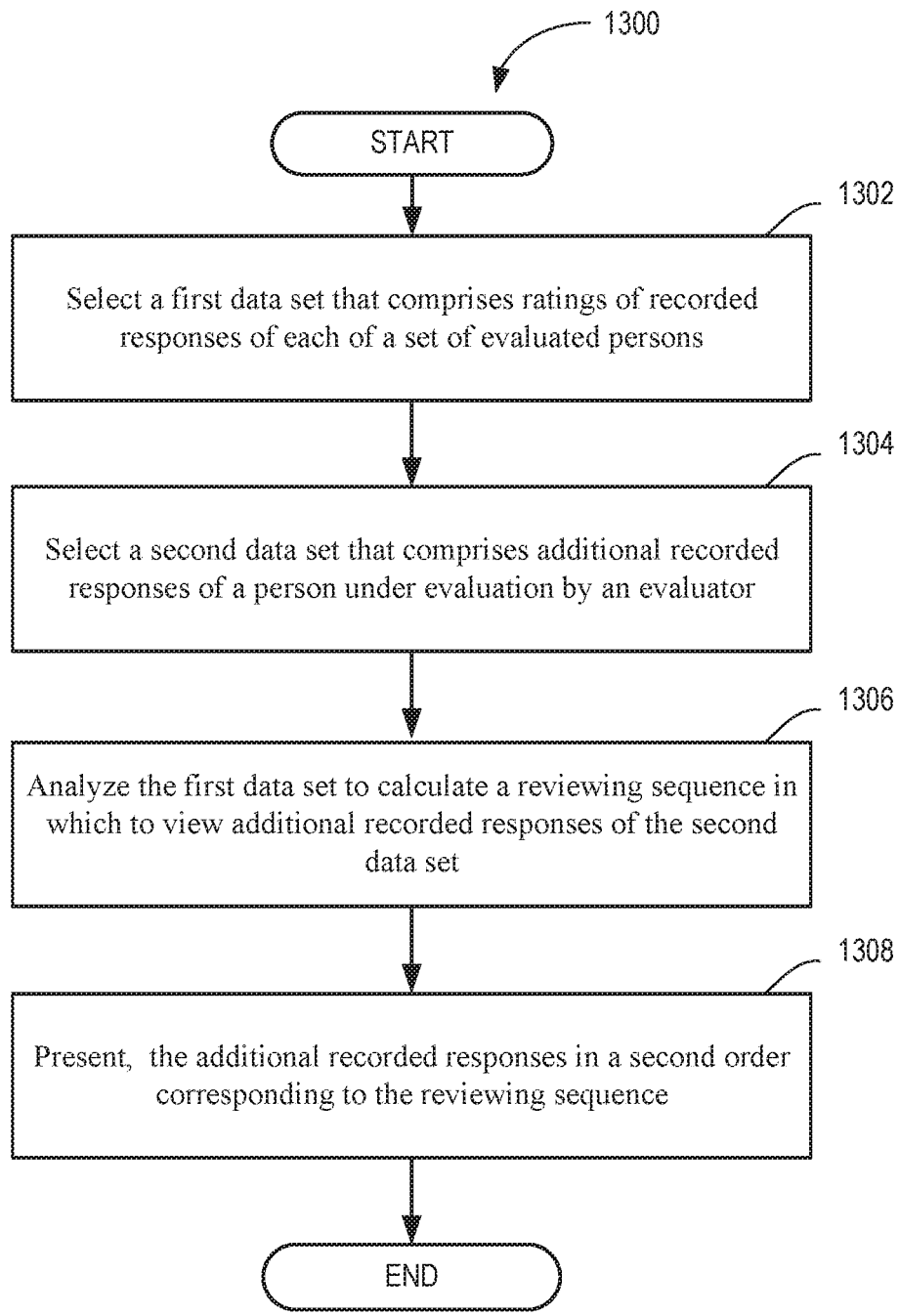
FIG. 13 is a flow diagram of a method for facilitating the evaluation of candidates in an evaluation process according to one embodiment.

FIG. 13 is a flow diagram illustrating a method 1300 for facilitating the evaluation of a plurality of candidates in an evaluation process. The method 1300 may be performed by processing logic that comprises hardware (e.g., circuitry, dedicated logic, programmable logic, microcode, etc.), software (e.g., instructions run on a processing device to perform hardware simulation), or a combination thereof.

Embodiments of the method 1300 may begin at block 1302 in which processing logic selects a first data set that includes ratings of recorded responses of each of a set of evaluated persons. The recorded responses may be responsive to multiple prompts presented to each of the evaluated persons in a recording sequence during an evaluation. The data also include an evaluation result of each of the evaluated persons in the evaluation at the point. The first data set may be collected from an evaluator or evaluators via a user interface, such as the exemplary user interface 500 as seen in FIGS. 5, 6, 7, and 8. At block 1304, the processing logic selects a second data set that includes additional recorded response of a person under evaluation. The person under evaluation may be part of a set of candidates, some of which have been evaluated (like the set of evaluated persons) and some of which have not yet been evaluated (like the person under evaluation). The additional recorded responses may be responsive to the same plurality of prompts and are in a first order corresponding to a recording sequence, or a sequence in which the additional recorded responses were recorded. An evaluator may use the processing logic to select both the first data set and the second data set.

At block 1306, the processing logic analyzes the first data set to calculate a reviewing sequence in which to present the additional recorded responses of the second data set. The processing logic may perform the analysis using an evaluation-assessment tool, such as the evaluation-assessment tool 110 of FIG. 1 and the evaluation-assessment tool 210 of FIG. 2.

At block 1308, the processing logic may present the additional recorded response in a second order corresponding to the reviewing sequence to an evaluator via the user interface. In this way, an evaluator may view recorded responses of candidates in an optimized order, such that the evaluator may provide evaluation results (e.g., a recommendation or a decision) in an efficient manner. The evaluator may be able to evaluate the most predictive questions first and skip viewing one or more recorded responses that may be less predictive of an evaluation result.

In a further embodiment, the processing logic forms a ratings matrix that includes the ratings of the recorded responses of the set of evaluated persons. The ratings for each evaluated person of the set of evaluated persons may be provided in a separate row of the matrix and in the first order. The processing logic may also form an evaluation result vector that includes the evaluation result of each of the evaluated persons in the evaluation and calculate the reviewing sequence based on the ratings matrix and the evaluation result vector. In another embodiment, the first data set and the second data set include video recordings of responses to prompts in a digital interview.

In an additional embodiment, the processing logic presents, in the user interface, an evaluation decision prediction for the person under evaluation. The evaluation decision prediction may be based at least on a rating of one of the additional recorded responses of the person under evaluation or the collected data. The processing logic may also receive, from the evaluator, a rating of one of the additional recorded responses of the person under evaluation to one of the plurality of prompts and update the evaluation decision prediction upon receipt of the rating and based on the rating.

In some embodiments, the processing logic receives, from the evaluator, a rating of one of the additional recorded response of the person under evaluation, alters an order of remaining prompts in the reviewing sequence to provide an updated reviewing sequence, and presents, to the evaluator via the user interface, a first remaining response of the additional recorded responses according to the updated reviewing sequence. In some embodiments, the processing logic analyzes the first data set to calculate the reviewing sequence thereby creating a prediction model based on the first data set. The prediction model may predict an evaluation result from a vector of ratings of at least some of the additional recorded responses of the person under evaluation. The prediction model may utilize at least one of regression analysis, neural networks, support vector machines, decision trees, and a Markov model variant.

Additionally, the processing logic may determine whether an amount of data in the first data set exceeds a threshold before analyzing the first data set to calculate the reviewing sequence. Furthermore, the processing logic may receive ratings from the evaluator for at least one of the additional recorded responses, receive an evaluation result of the person under evaluation, augment the first data set with the ratings from the evaluator and the evaluation result of the person under evaluation, and analyze the augmented first data set to calculate an updated reviewing sequence in which to view each of the recorded responses of a next person under evaluation. This analysis may be performed by the evaluation-assessment tool executing on a processing device.

Figure 14:
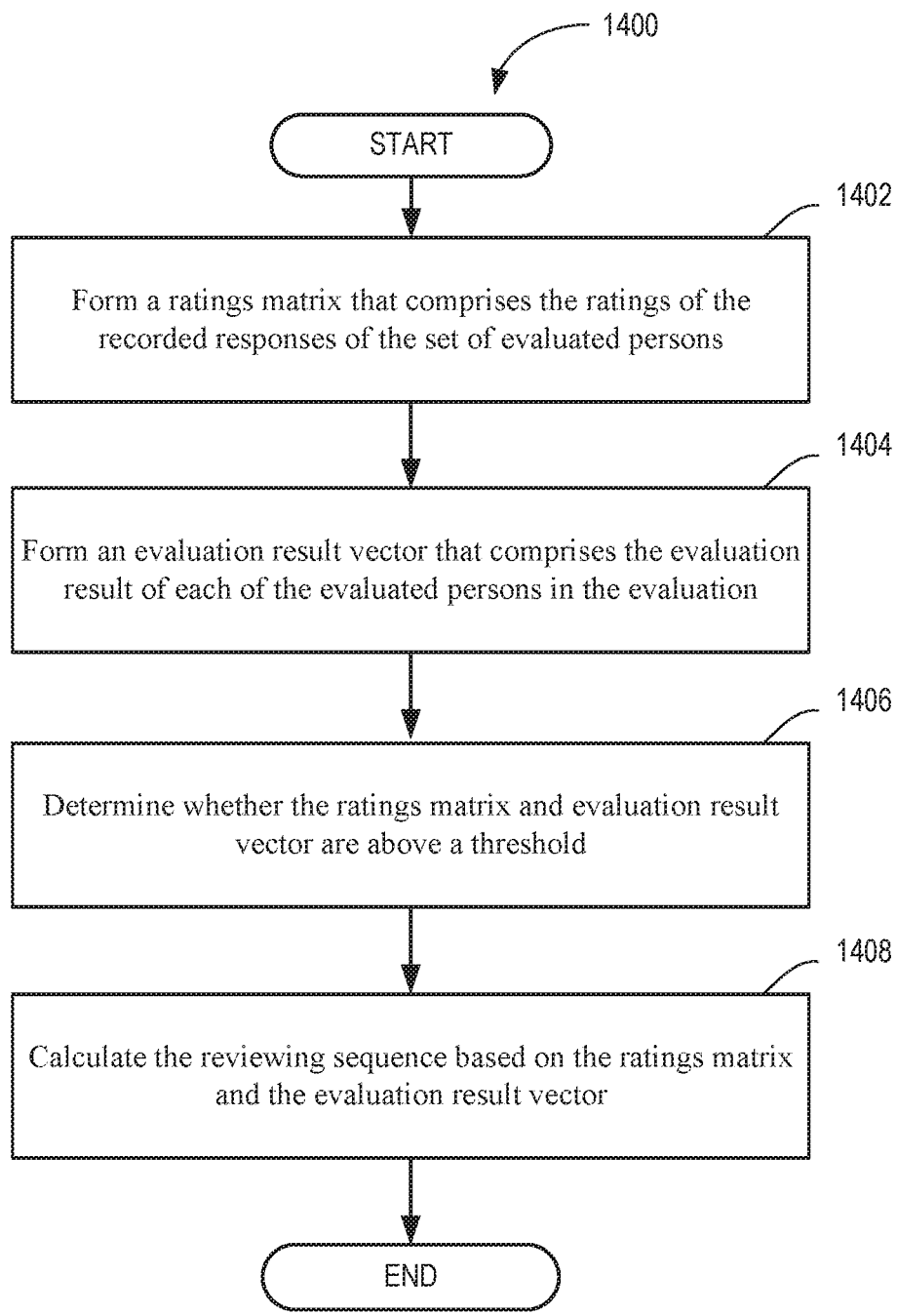
FIG. 14 is another flow diagram of a method for providing an optimized review sequence in which to view a candidate's recorded responses according to one embodiment.

FIG. 14 is another flow diagram of a method 1400 for providing an optimized review sequence in which to view a candidate's recorded responses according to one embodiment. In one embodiment, the evaluation-assessment tool 110 of FIG. 1 performs the method 1400. In another embodiment, the evaluation-assessment tool 210 of FIG. 2 performs the method 1400. Alternatively, other components of the server computing system 104, client-computing system 102, or both can perform some or all of the operations of method 1400.

Referring to FIG. 14, the method 1400 may begin at block 1402 in which processing logic forms a ratings matrix that includes ratings of recorded responses of each of a set of evaluated persons. The recorded responses are responsive to a plurality of prompts provided in a default sequence, such that the recorded responses are recorded in the default sequence. This default sequence may be referred to as a recording sequence. At block 1404, the processing logic forms an evaluation result vector that includes an evaluation result of each of the set of evaluated persons. If ratings are present for an evaluated person, but the evaluation result is not present, the associated ratings for that evaluated person may be discarded from the ratings matrix.

At block 1406, the processing logic determines whether the ratings matrix and evaluation result vector are above a threshold in quality and/or quantity in order to calculate an optimized reviewing sequence in which to present the recorded responses of a person under evaluation to an evaluator. At block 1408, when the quality and/or quality of the ratings matrix and evaluation result vector are at or above the threshold, the processing logic may calculate the optimized reviewing sequence. This may be done by the evaluation-assessment tool 110 of FIG. 1 or by other features as described in this disclosure.

The evaluation-assessment tool 110, and its components as described herein, can be trained to identify an optimal order in which to view and rate the recorded responses of candidates. The evaluation-assessment tool 110 may further provide an indication to evaluators of how a particular candidate, under evaluation, is likely to be evaluated. This may allow evaluators to skip reviewing the least predictive recorded responses with confidence, thereby enabling the evaluator to evaluator candidates more efficiently without significantly diminishing the quality of the evaluation. Thus, better candidates may be identified in less time.

Figure 15:
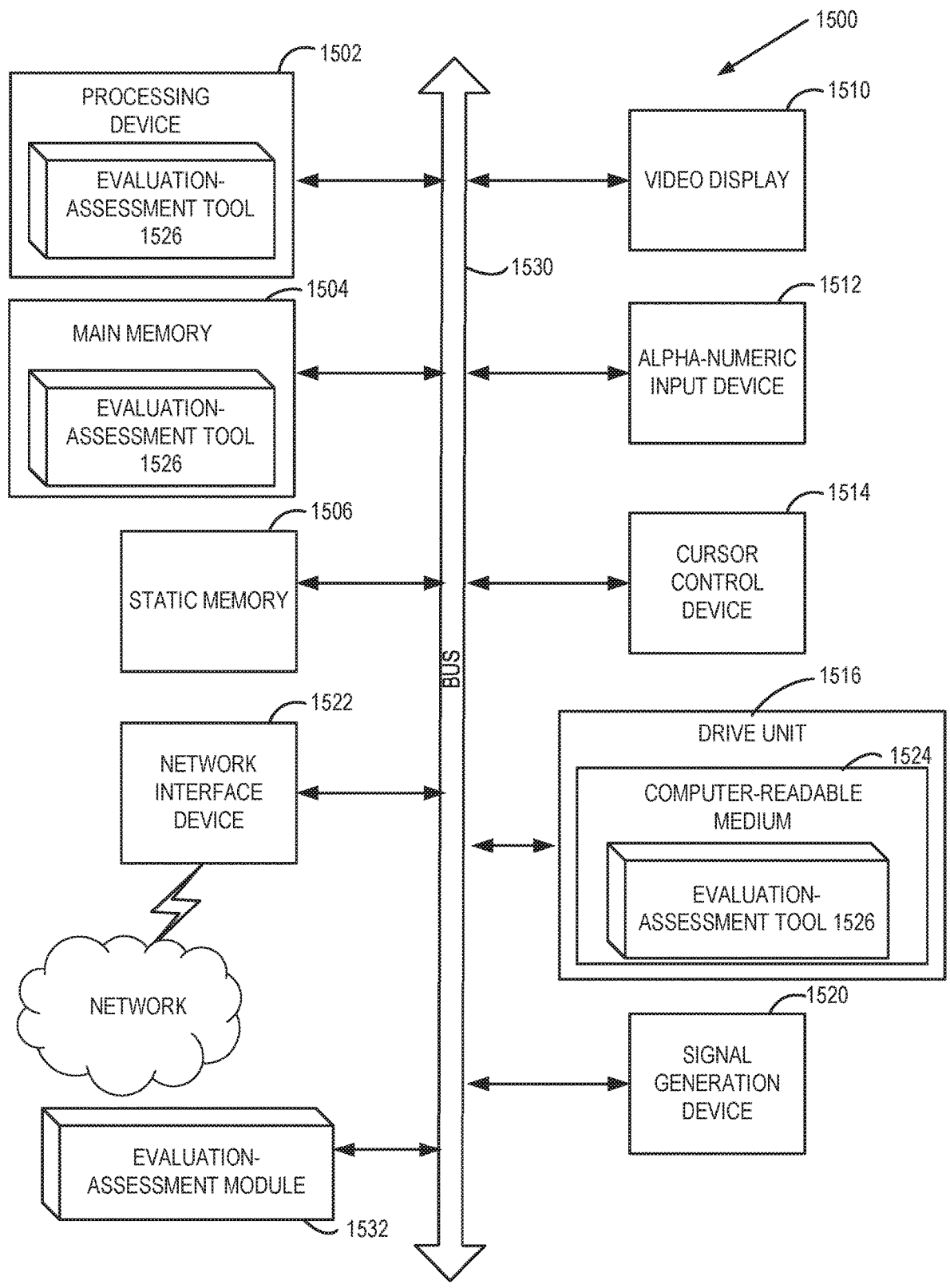
FIG. 15 illustrates a diagrammatic representation of a machine in the exemplary form of a computing system for model-assisted evaluation and intelligent interview feedback according to an embodiment.

FIG. 15 illustrates a diagrammatic representation of a machine in the exemplary form of a computing system for evaluation-assessment. Within the computing system 1500 is a set of instructions for causing the machine to perform any one or more of the methodologies discussed herein. In alternative embodiments, the machine may be connected (e.g., networked) to other machines in a LAN, an intranet, an extranet, or the Internet. The machine may operate in the capacity of a server or a client machine in a client-server network environment, or as a peer machine in a peer-to-peer (or distributed) network environment. The machine may be a PC, a tablet PC, a set-top-box (STB), a personal data assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein for evaluation-assessment, including evaluation result prediction and optimized review sequence generation, for evaluating digital interviews and other assessment or evaluations, such as the methods 1300 and 1400 as described above. In one embodiment, the computing system 1500 represents various components that may be implemented in the server computing system 104 as described above. Alternatively, the server computing system 104 may include more or less components as illustrated in the computing system 1500.

The exemplary computing system 1500 includes a processing device 1502, a main memory 1504 (e.g., read-only memory (ROM), flash memory, dynamic random access memory (DRAM) such as synchronous DRAM (SDRAM), etc.), a static memory 1506 (e.g., flash memory, static random access memory (SRAM), etc.), and a data storage device 1516, each of which communicate with each other via a bus 1530.

Processing device 1502 represents one or more general-purpose processing devices such as a microprocessor, central processing unit, or the like. More particularly, the processing device 1502 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 1502 may also be one or more special-purpose processing devices such as an application specific integrated circuit (ASIC), a field programmable gate array (FPGA), a digital signal processor (DSP), network processor, or the like. The processing device 1502 is configured to execute the processing logic (e.g., evaluation-assessment tool 1526) for performing the operations and steps discussed herein.

The computing system 1500 may further include a network interface device 1522. The computing system 1500 also may include a video display unit 1510 (e.g., a liquid crystal display (LCD) or a cathode ray tube (CRT)), an alphanumeric input device 1512 (e.g., a keyboard), a cursor control device 1514 (e.g., a mouse), and a signal generation device 1520 (e.g., a speaker).

The data storage device 1516 may include a computer-readable storage medium 1524 on which is stored one or more sets of instructions (e.g., evaluation-assessment tool 1526) embodying any one or more of the methodologies or functions described herein. The evaluation-assessment tool 1526 may also reside, completely or at least partially, within the main memory 1504 and/or within the processing device 1502 during execution thereof by the computing system 1500, the main memory 1504 and the processing device 1502 also constituting computer-readable storage media. The evaluation-assessment tool 1526 may further be transmitted or received over a network via the network interface device 1522.

While the computer-readable storage medium 1524 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing a set of instructions for execution by the machine and that causes the machine to perform any one or more of the methodologies of the present embodiments. The term "computer-readable storage medium" shall accordingly be taken to include, but not be limited to, solid-state memories, optical media, magnetic media or other types of mediums for storing the instructions. The term "computer-readable transmission medium" shall be taken to include any medium that is capable of transmitting a set of instructions for execution by the machine to cause the machine to perform any one or more of the methodologies of the present embodiments.

The evaluation-assessment tool, components, and other features described herein can be implemented as discrete hardware components or integrated in the functionality of hardware components such as ASICS, FPGAs, DSPs, or similar devices. The evaluation-assessment module 1532 may implement operations of evaluation-assessment as described herein. In addition, the evaluation-assessment module 1532 can be implemented as firmware or functional circuitry within hardware devices. Further, the evaluation-assessment module 1532 can be implemented in any combination hardware devices and software components.

Some portions of the detailed description that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "receiving," "generating," "analyzing," "capturing," "executing," "defining," "specifying," "selecting," "recreating," "processing," "providing," "computing," "calculating," "determining," "displaying," or the like, refer to the actions and processes of a computing system, or similar electronic computing systems, that manipulates and transforms data represented as physical (e.g., electronic) quantities within the computing system's registers and memories into other data similarly represented as physical quantities within the computing system memories or registers or other such information storage, transmission or display devices.

Embodiments of the present invention also relate to an apparatus for performing the operations herein. This apparatus may be specially constructed for the required purposes, or it may comprise a general-purpose computing system specifically programmed by a computer program stored in the computing system. Such a computer program may be stored in a computer-readable storage medium, such as, but not limited to, any type of disk including optical disks, CD-ROMs, and magnetic-optical disks, read-only memories (ROMs), random access memories (RAMs), EPROMs, EEPROMs, magnetic or optical cards, or any type of media suitable for storing electronic instructions.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to utilize the invention and various embodiments with various modifications as may be suited to the particular use contemplated.

What is claimed is:

1. A method comprising:
   storing, by a processing device, a trained modeling function, wherein the trained modeling function embodies a correlation between historical ratings and historical evaluation results of recorded responses that were responsive to a plurality of prompts presented to a set of persons, wherein the recorded responses are portions of digital interviews;
   receiving, via a graphical user interface (GUI), a request to initiate a digital evaluation process for a second person being evaluated;
   receiving recorded responses of the second person that are responsive to the plurality of prompts;

generating, by the processing device applying the trained modeling function to the recorded responses of the second person, a reviewing sequence by which to view the recorded responses of the second person, the reviewing sequence ordering the recorded responses of the second person from a most predictive prompt to a least predictive prompt of the plurality of prompts;

transmitting, by the processing device, data that causes display in the GUI of a list of the recorded responses of the second person in the reviewing sequence;

delivering, by the processing device to the GUI for review, one or more recorded responses listed first according to the reviewing sequence for the second person;

in response to receiving, via the GUI, one or more ratings for the one or more recorded responses, delivering, to the GUI, an evaluation decision prediction based on the one or more ratings; and in response to receiving, via the GUI, an evaluation result associated with the evaluation decision prediction, ending, by the processing device, review of the recorded responses for the second person.

2. The method of claim 1, further comprising generating, by the processing device applying the trained modeling function to a current rating of at least one of the recorded responses of the second person, the evaluation decision prediction for the second person.

3. The method of claim 1, further comprising:
receiving an evaluation result and a current rating for at least one of the recorded responses of the second person;
inserting, into a training data set, the current rating and the evaluation result of the at least one of the recorded responses of the second person, to generate an updated training data set; and
updating training of the trained modeling function using a correlation between the historical ratings and the historical evaluation results of the recorded responses within the updated training data set, to generate an updated trained modeling function.

4. The method of claim 3, further comprising:
generating, by the processing device applying the updated trained modeling function to the recorded responses of the second person, a second reviewing sequence by which to view the recorded responses of the second person; and
transmitting, by the processing device, second data that causes display of the list of the recorded responses of the second person in the second reviewing sequence.

5. The method of claim 1, further comprising:
altering an order of remaining prompts in the reviewing sequence to provide an updated reviewing sequence; and
presenting, via the GUI, a first remaining response of the recorded responses of the second person according to the updated reviewing sequence.

6. The method of claim 1, wherein the trained modeling function utilizes at least one of regression analysis, neural networks, support vector machines, decision trees, or a Markov model variant.

7. The method of claim 1, further comprising determining whether an amount of the historical ratings and the historical evaluation results exceeds a threshold number of ratings and corresponding evaluation results before training the modeling function.

8. A computing system comprising:
a data storage device; and
a processing device, coupled to the data storage device, to execute instructions to:
store, in the data storage device, a trained modeling function, wherein the trained modeling function embodies a correlation between historical ratings and historical evaluation results of recorded responses that were responsive to a plurality of prompts presented to a set of persons, wherein the recorded responses are portions of digital interviews;
receive, via a graphical user interface (GUI), a request to initiate a digital evaluation process for a second person being evaluated;
receive recorded responses of the second person that are responsive to the plurality of prompts;
generate, by applying the trained modeling function to the recorded responses of the second person, a reviewing sequence by which to view the recorded responses of the second person, the reviewing sequence ordering the recorded responses of the second person from a most predictive prompt to a least predictive prompt of the plurality of prompts;
transmit data that causes display in the GUI of a list of the recorded responses of the second person in the reviewing sequence;
delivering, to the GUI for review, one or more recorded responses listed first according to the reviewing sequence for the second person;
in response to receiving, via the GUI, one or more ratings for the one or more recorded responses, delivering, to the GUI, an evaluation decision prediction based on the one or more ratings; and
in response to receiving, via the GUI, an evaluation result associated with the evaluation decision prediction, ending review of the recorded responses for the second person.

9. The computing system of claim 8, wherein the recorded responses of the set of persons and the recorded responses of the second person comprise video recordings of responses to prompts in the digital interviews.

10. The computing system of claim 8, wherein the processing device is further to receive a current rating of at least one of the recorded responses of the second person.

11. The computing system of claim 10, wherein the processing device is further to generate, by applying the trained modeling function to the current rating of the at least one of the recorded responses of the second person, the evaluation decision prediction for the second person.

12. The computing system of claim 10, wherein the processing device is further to:
receive an evaluation result for the at least one of the recorded responses of the second person;
insert, into a training data set, the current rating and the evaluation result of the at least one of the recorded responses of the second person, to generate an updated training data set; and
update training of the trained modeling function using a correlation between the historical ratings and the historical evaluation results of the recorded responses within the updated training data set, to generate an updated trained modeling function.

13. The computing system of claim 12, wherein the processing device is further to:
generate, by applying the updated trained modeling function to the recorded responses of the second person, a second reviewing sequence by which to view the recorded responses of the second person; and transmit second data that causes display of the list of the recorded responses of the second person in the second reviewing sequence.

14. The computing system of claim 8, wherein the processing device is further to:

alter an order of remaining prompts in the reviewing sequence to provide an updated reviewing sequence; and present, via a user interface, a first remaining response of the recorded responses of the second person according to the updated reviewing sequence.

15. The computing system of claim 8, wherein the trained modeling function utilizes at least one of regression analysis, neural networks, support vector machines, decision trees, or a Markov model variant.

16. The computing system of claim 8, wherein the processing device is further to determine whether an amount of the historical ratings and the historical evaluation results exceeds a threshold number of ratings and corresponding evaluation results before training the modeling function.

17. A non-transitory computer-readable storage medium including instructions that, when executed by a processing device, cause the processing device to perform operations comprising:

storing a trained modeling function, wherein the trained modeling function embodies a correlation between historical ratings and historical evaluation results of recorded responses that were responsive to a plurality of prompts presented to a set of persons, wherein the recorded responses are portions of digital interviews;

receiving, via a graphical user interface (GUI), a request to initiate a digital evaluation process for a second person being evaluated;

receiving recorded responses of the second person that are responsive to the plurality of prompts;

generating, by applying the trained modeling function to the recorded responses of the second person, a reviewing sequence by which to view the recorded responses of the second person, the reviewing sequence ordering the recorded responses of the second person from a most predictive prompt to a least predictive prompt of the plurality of prompts;

transmitting data that causes display in the GUI of a list of the recorded responses of the second person in the reviewing sequence; and delivering, to the GUI for review, one or more recorded responses listed first according to the reviewing sequence for the second person;

in response to receiving, via the GUI, one or more ratings for the one or more recorded responses, delivering, to the GUI, an evaluation decision prediction based on the one or more ratings; and in response to receiving, via the GUI, an evaluation result associated with the evaluation decision prediction, ending review of the recorded responses for the second person.

18. The non-transitory computer-readable storage medium of claim 17, wherein the operations further comprise:

populating a ratings matrix with the historical ratings of the recorded responses of the set of persons, wherein each row of the ratings matrix comprises a vector of ratings for a person of the set of persons;

populating an evaluation results vector with the historical evaluation results corresponding to the historical ratings for the set of persons; and training the trained modeling function comprising:

correlating a plurality of vectors of the ratings matrix with corresponding entries of the evaluation results vector for the set of persons; and assessing prediction results for a plurality of possible sequences of columns of the ratings matrix.

19. The non-transitory computer-readable storage medium of claim 17, wherein the operations further comprise:

receiving an evaluation result and a current rating for the at least one of the recorded responses of the second person;

inserting, into a training data set, the current rating and the evaluation result of the at least one of the recorded responses of the second person, to generate an updated training data set; and updating training of the trained modeling function using a correlation between the historical ratings and the historical evaluation results of the recorded responses within the updated training data set, to generate an updated modeling function.

20. The non-transitory computer-readable storage medium of claim 19, wherein the operations further comprise:

generating, by applying the updated modeling function to the recorded responses of the second person, a second reviewing sequence by which to view the recorded responses of the second person; and transmitting second data that causes display of the list of the recorded responses of the second person in the second reviewing sequence.

* * * * *